(12) United States Patent
Shimodaira

(10) Patent No.: US 8,421,764 B2
(45) Date of Patent: Apr. 16, 2013

(54) METHOD OF DRIVING ELECTROPHORETIC DISPLAY DEVICE, ELECTROPHORETIC DISPLAY DEVICE, AND ELECTRONIC APPARATUS

(75) Inventor: Yasuhiro Shimodaira, Munich (DE)

(73) Assignee: Seiko Epson Corporation (JP)

( * ) Notice: Subject to any disclaimer, the term of this patent is extended or adjusted under 35 U.S.C. 154(b) by 623 days.

(21) Appl. No.: 12/633,097

(22) Filed: Dec. 8, 2009

(65) Prior Publication Data

US 2010/0156829 A1 Jun. 24, 2010

(30) Foreign Application Priority Data

Dec. 19, 2008 (JP) ................................. 2008-323616

(51) Int. Cl.
*G06F 3/041* (2006.01)
(52) U.S. Cl.
USPC .............. 345/173; 345/87; 345/103; 345/107
(58) Field of Classification Search ........................ None
See application file for complete search history.

(56) References Cited

U.S. PATENT DOCUMENTS

| | | | | |
|---|---|---|---|---|
| 7,542,024 B2* | 6/2009 | Koyama | ......................... | 345/107 |
| 2002/0005832 A1* | 1/2002 | Katase | ............................ | 345/107 |
| 2003/0048370 A1 | 3/2003 | Koyama | | |
| 2003/0151582 A1* | 8/2003 | Ishii | ............................. | 345/100 |
| 2005/0012726 A1* | 1/2005 | Fujikawa | ...................... | 345/204 |
| 2006/0214918 A1* | 9/2006 | Destura et al. | ................ | 345/173 |
| 2008/0158198 A1* | 7/2008 | Elias | ............................. | 345/174 |
| 2008/0238867 A1* | 10/2008 | Maeda et al. | ................. | 345/107 |

FOREIGN PATENT DOCUMENTS

| | | |
|---|---|---|
| JP | 2000-214999 | 8/2000 |
| JP | 2003-084314 | 3/2003 |
| JP | 2007-094262 | 4/2007 |
| JP | 2007-225757 | 9/2007 |
| JP | 2008-268853 | 11/2008 |

* cited by examiner

*Primary Examiner* — Dismery Mercedes
(74) *Attorney, Agent, or Firm* — Harness, Dickey & Pierce, P.L.C.

(57) ABSTRACT

A method for driving a touch panel-mounted electrophoretic display device includes: connecting a first control line or a second control line and a first electrode of the device with a switching circuit based on output from a memory circuit, and setting the electric potentials of the first and second control lines to first and second potentials, during an inputting period when positional information is input to the touch panel; and inputting an image signal including a touch panel signal for displaying the trajectory of the positional information input to the touch panel to the memory circuit of the selected pixel through the data lines and a pixel switching element by selecting the pixel connected to the corresponding scanning line by simultaneously supplying a scanning signal to the scanning lines while the potential of the second electrode is set to the first electric potential.

10 Claims, 15 Drawing Sheets

METHOD OF DRIVING ELECTROPHORETIC DISPLAY DEVICE, ELECTROPHORETIC DISPLAY DEVICE, AND ELECTRONIC APPARATUS

BACKGROUND

1. Technical Field

The present invention relates to a method of driving an electrophoretic display device, an electrophoretic display device, and an electronic apparatus.

2. Related Art

Electrophoretic display devices are configured to include a plurality of first electrodes (pixel electrodes), a second electrode that faces the plurality of first electrodes, and electrophoretic elements pinched between the first electrodes and the second electrode. In order to display an image by using the electrophoretic display device, an image signal is temporarily stored in a memory circuit through a switching element. When an electric potential is applied to the first electrode by inputting the image signal stored in the memory circuit to the first electrode, an electric potential difference is generated between the first electrode and the second electrode to which a predetermined electric potential is applied. Accordingly, the electrophoretic elements are driven, whereby an image can be displayed.

As the memory circuit, an SRAM type that uses an SRAM (Static Random Access Memory), a DRAM (Dynamic Random Access Memory) type that uses a capacitor, or the like is used (for example, see JP-A-2003-84314).

In order to display an image in the electrophoretic display device, electrophoretic particles need to be moved to one electrode by applying a sufficient electric potential difference between the electrodes that pinch the electrophoretic elements. Accordingly, a power source voltage of 10 V or more is needed for the memory circuit. At this moment, when different colors are displayed in adjacent pixels, different electric potentials are input to the first electrodes (pixel electrodes) of the adjacent pixels.

Accordingly, in such a case, a large electric potential difference is generated between the first electrodes adjacent to each other. Therefore, there is a problem in that a leakage current may be generated between the first electrodes adjacent to each other through an adhesive agent that fixes the electrophoretic elements to the substrates. Although such a leakage current flowing near one pixel is small, a leakage current for the entire display unit of the electrophoretic display device is large. Therefore, there is a problem in that the power consumption of the electrophoretic display device increases.

In addition, the first electrode may cause a chemical reaction due to generation of the leakage current. Accordingly, there is a problem that the reliability of the electrophoretic display device may be degraded. Thus, the reliability may be improved by using a material, such as gold or platinum, which is chemically stable and resistant against corrosion, for the first electrode. However, in such a case, there is a problem in that the manufacturing cost thereof increases.

As means for solving such problems, an electrophoretic display device in which the electric potential of the pixel electrode can be controlled by using a switching circuit has been proposed (see JP-A-2008-268853). According to such an electrophoretic display device, the leakage can be suppressed, and whereby display can be controlled by using a control line.

However, in the above-described electrophoretic display device, writing of data into a pixel and supplying of the electric potential to a pixel electrode corresponding to the data may be performed at different times. Accordingly, there is a problem that sequential display cannot be performed.

SUMMARY

An advantage of some aspects of the invention is that it provides a method of driving an electrophoretic display device, an electrophoretic display device, and an electronic apparatus that are capable of performing sequential display.

According to a first aspect of the invention, there is provided a method of driving a touch panel-mounted electrophoretic display device that is formed by pinching an electrophoretic element including electrophoretic elements between one pair of substrates. A first electrode is formed for each pixel on one of the substrates, and a second electrode common to a plurality of the pixels is formed on the other of the substrates. Each of the pixels includes: a pixel switching element that is connected to a plurality of scanning lines aligned in a first direction and data lines disposed in a second direction; a memory circuit that is connected to the pixel switching element; and a switching circuit that is disposed between the memory circuit and the first electrode. In addition, a first control line and a second control line are connected to the switching circuit. The method includes: connecting the first control line or the second control line and the first electrode by operating the switching circuit based on the output of the memory circuit, and setting the electric potential of the first control line and the electric potential of the second control line to a first electric potential and a second electric potential, during an operation inputting period in which positional information is input to the touch panel; and inputting an image signal that includes a touch panel signal used for displaying the trajectory of the positional information input to the touch panel in the electrophoretic element to the memory circuit of the selected pixel through the data lines and the pixel switching element by selecting the pixel that is connected to the corresponding scanning line by simultaneously supplying a scanning signal to the plurality of scanning lines in a state in which the electric potential of the second electrode is set to the first electric potential.

According to the above-described method of driving a touch panel-mounted electrophoretic display device, the reliability of the product can be improved by suppressing the leakage current between the pixels by controlling the first control line and the second control line. In addition, according to the above-described method, the electrophoretic elements are driven by generating an electric potential difference between the electrodes, and accordingly, the display can be changed in accordance with the data input process. Therefore, the images can be sequentially displayed without incurring a remarkable increase in the scale of the circuit. In addition, according to the above-described method, during the operation inputting period in which the positional information is input to the touch panel, pixels connected to scanning lines are selected by simultaneously supplying a scanning signal to the plurality of the scanning lines, and a touch panel signal is supplied to the memory circuit through the data line and the pixel switching element. Accordingly, the response of writing display on the basis of the touch panel signal can be improved.

In the above-described method of driving an electrophoretic display device, in the inputting of an image signal, the scanning signal may be supplied from the scanning line, which is connected to the pixel corresponding to the positional information input to the touch panel or a position near the positional information, out of the plurality of scanning lines.

In such a case, the scanning signal is supplied from the scanning line, which is connected to the pixel corresponding to the positional information input to the touch panel or a position near the positional information, out of the plurality of scanning lines. Accordingly, the response of writing display can be improved further.

In the above-described method of driving an electrophoretic display device, a contrast raising period, when the electric potential of the first control line is set to a third electric potential that is higher than the first electric potential, may be included after the operation inputting period.

In such a case, the contrast raising period, when the electric potential of the first control line is set to the third electric potential that is higher than the first electric potential, is included after the operation inputting period, and accordingly, the voltage applied between the first electrode and the second electrode can be increased further. As a result, even when the contrast is insufficient at the time of the inputting of an image signal, desired display contrast can be acquired.

In the above-described method of driving an electrophoretic display device, in the inputting of an image signal, the number of the scanning lines to which the scanning signal is simultaneously supplied may be configured to be adjusted in accordance with the arrangement direction of the scanning lines and the direction of the trajectory of the positional information in the case where the trajectory of the positional information is tilted with respect to the arrangement direction of the scanning lines.

In such a case, the number of the scanning lines to which the scanning signal is simultaneously supplied is adjusted in accordance with the arrangement direction of the scanning lines and the direction of the handled trajectory in the case where the trajectory of the positional information is tilted with respect to the arrangement direction of the scanning lines. Accordingly, the display state can be maintained to be constant without depending on the tilt of the positional information.

In the above-described method of driving an electrophoretic display device, the inputting of an image signal may be configured to be continuously performed several times during the operation inputting period.

In such a case, the inputting of an image signal is continuously performed several times during the operation inputting period, and accordingly, a sufficient operation period can be acquired. In addition, various forms of the operation for the touch panel can be performed.

According to a second aspect of the invention, there is provided a touch panel-mounted electrophoretic display device that is formed by pinching an electrophoretic element including electrophoretic elements between one pair of substrates, and a first electrode is formed for each pixel on one of the substrates, and a second electrode common to a plurality of the pixels is formed on the other of the substrates. Each of the pixels includes: a pixel switching element that is connected to a plurality of scanning lines aligned in a first direction and data lines disposed in a second direction; a memory circuit that is connected to the pixel switching element; and a switching circuit that is disposed between the memory circuit and the first electrode, and a first control line and a second control line are connected to the switching circuit. The electrophoretic display device includes: a control device that performs: connecting the first control line or the second control line and the first electrode by operating the switching circuit based on the output of the memory circuit, and setting the electric potential of the first control line and the electric potential of the second control line to a first electric potential and a second electric potential, during an operation inputting period in which positional information is input to the touch panel; and inputting an image signal that includes a touch panel signal used for displaying the trajectory of the positional information input to the touch panel in the electrophoretic element to the memory circuit of the selected pixel through the data lines and the pixel switching element by selecting the pixel that is connected to the corresponding scanning line by simultaneously supplying a scanning signal to the plurality of scanning lines in a state in which the electric potential of the second electrode is set to the first electric potential.

According to the above-described electrophoretic display device, the reliability of the product can be improved by suppressing the leakage current between the pixels by controlling the first control line and the second control line. In addition, according to the above-described method, the electrophoretic elements are driven by generating an electric potential difference between the electrodes, and accordingly, the display can be changed in accordance with the data input process. Therefore, the images can be sequentially displayed without incurring a remarkable increase in the scale of the circuit. In addition, according to the above-described method, during the operation inputting period in which the positional information is input to the touch panel, pixels connected to scanning lines are selected by simultaneously supplying a scanning signal to the plurality of the scanning lines, and a touch panel signal is supplied to the memory circuit through the data line and the pixel switching element. Accordingly, the response of writing display on the basis of the touch panel signal can be improved.

In the above-described electrophoretic display device, the control device may be configured to include a scanning line driving circuit that can simultaneously select a plurality of the scanning lines.

In such a case, the control device has the scanning line driving circuit that can simultaneously select a plurality of the scanning lines. Accordingly, control for simultaneously supplying the scanning signal to the plurality of the corresponding scanning lines can be performed in an easy manner.

In the above-described electrophoretic display device, the scanning line driving circuit may have a plurality of start pulse inputting terminals to which a start pulse used for starting a sequential selection operation for the plurality of scanning lines is input.

In such a case, the plurality of start pulse inputting terminals, to which a start pulse used for starting a sequential selection operation for the plurality of scanning lines is input, is disposed in the scanning line driving circuit. Accordingly, the scanning signal can be supplied in accordance with the writing of the touch panel signal in a speedy manner.

In the above-described electrophoretic display device, the scanning line driving circuit may be disposed so as to be able to sequentially select the scanning lines in two arrangement directions of the plurality of the scanning lines.

In such a case, the scanning line driving circuit is disposed so as to be able to sequentially select the scanning lines in two arrangement directions of the plurality of the scanning lines. Accordingly, a speedy response can be realized without having to perform the high-speed operation of the scanning line driving circuit. In addition, since the supply of the electric potential to a plurality of the first electrodes can be performed all the time, uniformity of display between the pixels can be achieved.

According to a third aspect of the invention, there is provided an electronic apparatus that includes the above-described electrophoretic display device.

According to the above-described electronic apparatus, the electrophoretic display device capable of improving the response of writing display on the basis of the touch panel signal is included. Accordingly, an electronic apparatus that has high operability and can be operated more intuitively can be acquired.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
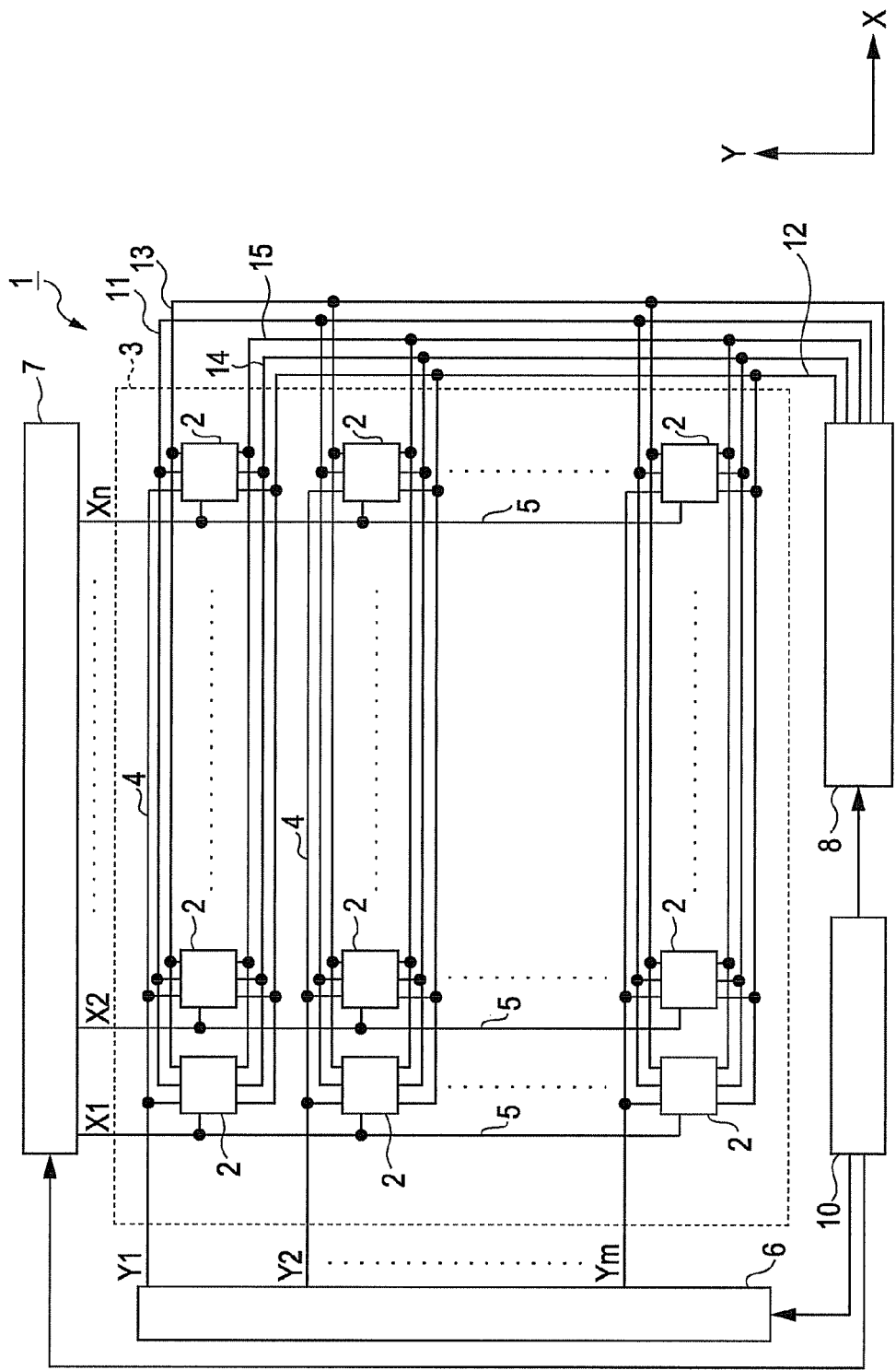
FIG. 1 is a diagram showing the configuration of an electrophoretic display device.

Hereinafter, an electrophoretic display device 1 according to an embodiment of the invention will be described with reference to the accompanying drawings. FIG. 1 is a diagram showing the configuration of the electrophoretic display device 1 according to the embodiment of the invention. The electrophoretic display device 1 includes a display unit 3, a scanning line driving circuit (pixel driving unit) 6, a data line driving circuit (pixel driving unit) 7, a common power modulating circuit (electric potential control unit) 8, and a controller 10.

In the display unit 3, pixels 2 are formed in the shape of a matrix in which M pixels are arranged in the Y-axis direction and N pixels are arranged in the X-axis direction. The scanning line driving circuit 6 is connected to the pixels 2 through a plurality of scanning lines 4 (Y1, Y2, ..., Ym) that extends over the display unit 3 in the X-axis direction. In addition, the scanning line driving circuit 6 is set so as to simultaneously select a plurality of scanning lines 4.

The data line driving circuit 7 is connected to the pixels 2 through a plurality of data lines 5 (X1, X2, ..., Xn) that extends over the display unit 3 in the Y-axis direction. The common power modulating circuit 8 is connected to the pixels 2 through a first control line 11, a second control line 12, a high-electric-potential power source line 13, a low-electric-potential power source line 14, and a common electrode power source wiring 15. The scanning line driving circuit 6, the data line driving circuit 7, and the common power modulating circuit 8 are controlled by the controller 10. The first control line 11, the second control line 12, the high-electric-potential power source line 13, the low-electric-potential power source line 14, and the common electrode power source wiring 15 are used as common wirings for all the pixels 2.

Next, a detailed configuration of the pixel 2 will be described with reference to FIG. 2.

Figure 2:
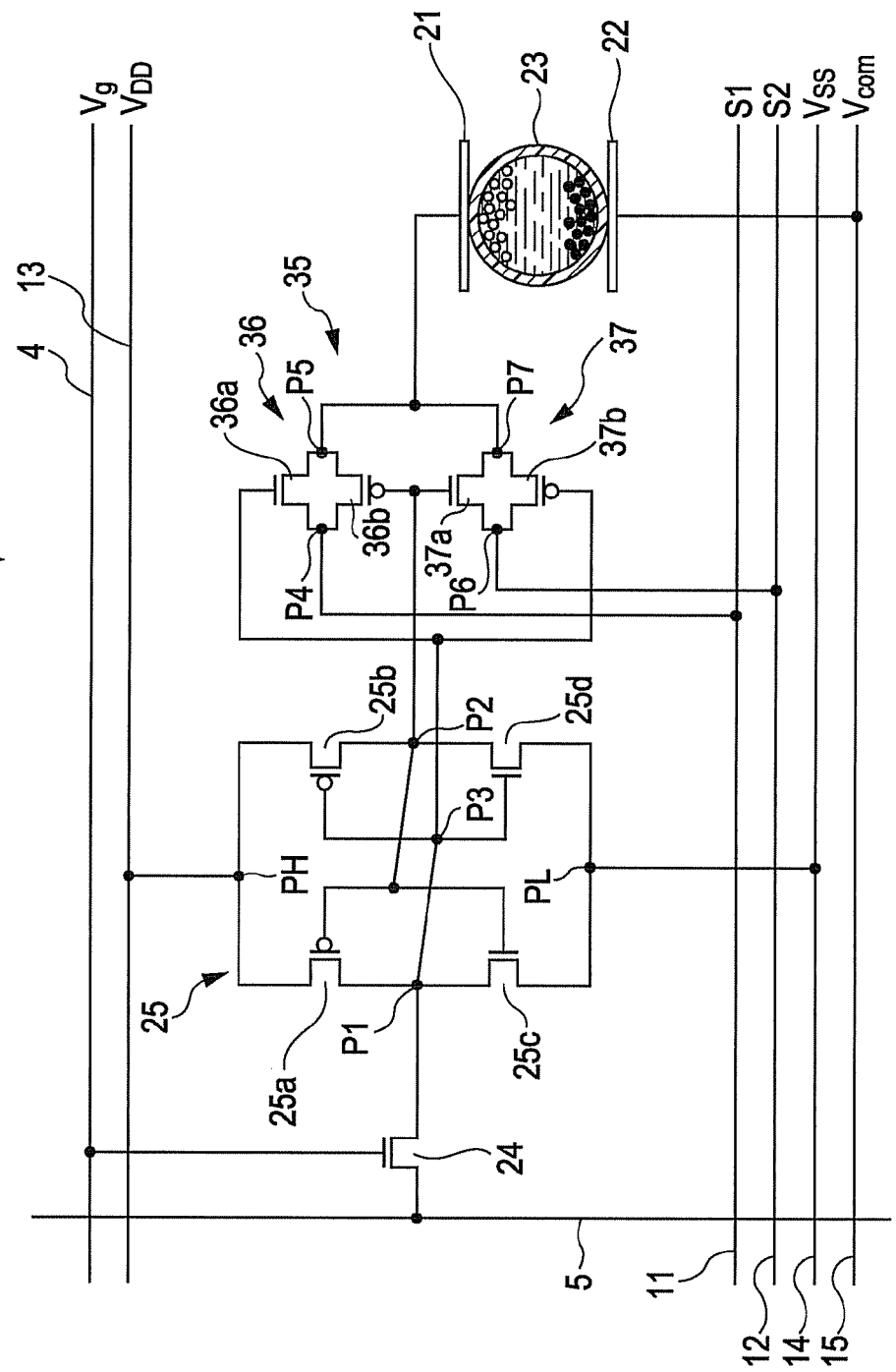
FIG. 2 is a diagram showing the circuit configuration of a pixel.

As shown in FIG. 2, the pixel 2 is configured by a driving TFT (pixel switching element) 24, an SRAM (memory circuit) 25, a switching circuit 35, a pixel electrode 21, a common electrode 22, and an electrophoretic element 23.

The driving TFT 24, for example, is configured by an N-MOS (Negative Metal Oxide Semiconductor) transistor. The driving TFT 24 has the gate electrode connected to the scanning line 4, the source electrode connected to the data line 5, and the drain electrode connected to the data input terminal P1 of the SRAM 25.

The SRAM 25 is a C-MOS (Complementary Metal Oxide Semiconductor) type. The SRAM 25 is configured by two P-MOS (Positive Metal Oxide Semiconductor) transistors 25a and 25b and two N-MOS transistors 25c and 25d.

The P-MOS transistor 25a has the source electrode connected to the high electric potential terminal PH, the drain electrode connected to the data input terminal P1, and the gate electrode connected to the gate electrode of the N-MOS transistor 25c and the data output terminal P2. The high electric potential terminal PH is connected to the high electric-potential power source line 13.

In addition, the P-MOS transistor 25b has the source electrode connected to the high electric potential terminal PH, the drain electrode connected to the data output terminal P2, and the gate electrode connected to the gate electrode of the N-MOS transistor 25d and the gate input terminal P3.

The N-MOS transistor 25c has the source electrode connected to the low electric potential terminal PL, the drain electrode connected to the data input terminal P1, and the gate electrode connected to the gate electrode of the P-MOS transistor 25a and the data output terminal P2. The low electric potential terminal PL is connected to the low electric-potential power source line 14.

The N-MOS transistor 25d has the source electrode connected to the low electric potential terminal PL, the drain electrode connected to the first data output terminal P2, and the gate electrode connected to the gate electrode of the P-MOS transistor 25b and the data output terminal P3. In addition, the data input terminal P1 and the data output terminal P3 are connected to each other.

As described above, the SRAM 25 is a memory circuit having one input and one output in which one bit image data can be stored. When an image signal that defines the image data of "1", that is, a high-level image signal is input to the data input terminal P1, a low-level signal is output from the data output terminal P2.

The switching circuit 35 is configured by a first transmission gate 36 and a second transmission gate 37. The first transmission gate 36 is configured by an N-MOS transistor 36a and a P-MOS transistor 36b. The source electrodes of the N-MOS transistor 36a and the P-MOS transistor 36b are connected to a first control line 11 through a signal input terminal P4, and the drain electrodes of the N-MOS transistor 36a and the P-MOS transistor 36b are connected to the pixel electrode 21 through a signal output terminal P5. In addition, the gate electrode of the N-MOS transistor 36a is connected to the data output terminal P3 of the SRAM 25, and the gate electrode of the P-MOS transistor 36b is connected to the data output terminal P2 of the SRAM 25.

The second transmission gate 37 is configured by an N-MOS transistor 37a and a P-MOS transistor 37b. The source electrodes of the N-MOS transistor 37a and the P-MOS transistor 37b are connected to a second control line 12 through a signal input terminal P6, and the drain electrodes of the N-MOS transistor 37a and the P-MOS transistor 37b are connected to the pixel electrode 21 through a signal output terminal P7. In addition, the gate electrode of the N-MOS transistor 37a is connected to the data output terminal P2 of the SRAM 25, and the gate electrode of the P-MOS transistor 37b is connected to the data output terminal P3 of the SRAM 25.

When the image data of "1" is stored in the SRAM 25 and a low-level signal is output from the data output terminal P2, the first transmission gate 36 is in the ON state, and a first driving signal S1, which is supplied to the signal input terminal P4 through the first control line 11, is supplied from the signal output terminal P5 to the pixel electrode 21. On the other hand, when the image data of "0" is stored in the SRAM 25 and a high-level signal is output from the data output terminal P2, the second transmission gate 37 is in the ON state, and a second driving signal S2, which is supplied to the signal input terminal P6 through the second control line 12, is supplied from the signal output terminal P7 to the pixel electrode 21.

The pixel electrode 21 is formed from Al (aluminum) and the like and applies a voltage to the electrophoretic element 23. Accordingly, the signal output terminal P5 of the first transmission gate 36 and the signal output terminal P7 of the second transmission gate 37 are electrically connected to each other. The common electrode 22 serving as an opposing electrode of the pixel electrode 21 is a transparent electrode formed from MgAg (Magnesium Silver), ITO (Indium Tin Oxide), IZO (Indium Zinc Oxide), and the like. To the common electrode 22, the common electric potential Vcom is supplied. The electrophoretic element 23 is pinched between the pixel electrode 21 and the common electrode 22, and displays an image in accordance with an electric field that is generated based on the electric potential difference between the pixel electrode 21 and the common electrode 22.

Figure 3:
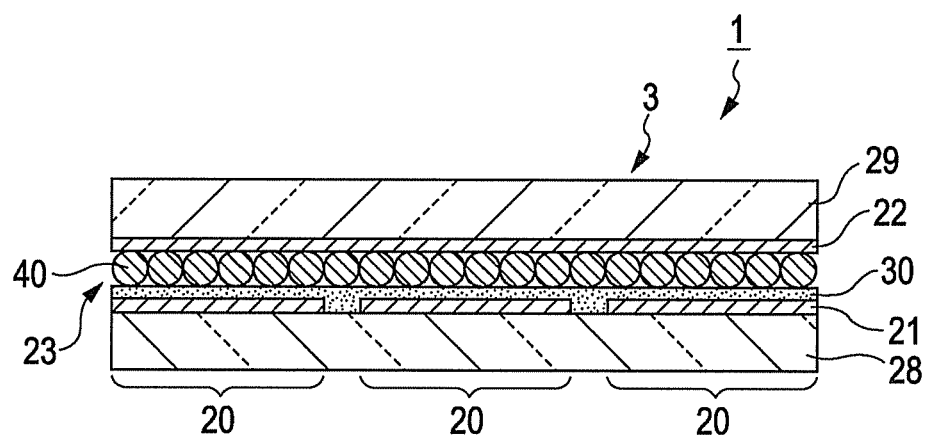
FIG. 3 is a cross-sectional view of a display unit of an electrophoretic display device.

FIG. 3 is a partial cross-sectional view of the display unit 3 of the electrophoretic display device 1. The electrophoretic display device 1 has a configuration in which an electrophoretic element 23, formed by arranging a plurality of microcapsules 40, is pinched between a component substrate 28 and an opposing substrate 29.

In the display unit 3, a plurality of pixel electrodes 21 is arranged so as to be formed on the electrophoretic element 23 side of the component substrate 28, and the electrophoretic element 23 is bonded to the pixel electrode 21 by using an adhesive agent layer 30. On the electrophoretic element 23 side of the opposing substrate 29, a planar shaped common electrode 22 is formed facing the plurality of pixel electrodes 21. In addition, the electrophoretic element 23 is disposed on the common electrode 22.

The component substrate 28 is a substrate that is formed from glass, plastic, or the like. Since it is disposed on the side opposite to the image display surface, the component substrate 28 does not have to be transparent. Although not shown in the figure, between the pixel electrode 21 and the component substrate 28, the scanning lines 4, the data lines 5, the pixel switching elements 24, the latch circuits 25, the switching circuit 35, and the like, that are shown in FIGS. 1 and 2, are formed.

The opposing substrate 29 is a substrate that is formed from glass, plastic, or the like. Since it is disposed on the image display side, the opposing substrate 29 is formed as a transparent substrate. The common electrode 22, which is formed on the opposing substrate 29, is formed by using a transparent conductive material such as MgAg (Magnesium Silver), ITO (Indium Tin Oxide), and IZO (Indium Zinc Oxide).

In addition, generally, the electrophoretic element 23 is formed on the opposing substrate 29 side in advance and is treated as an electrophoretic sheet up until the adhesive agent layer 30. In addition, on the adhesive agent layer 30 side, a peel-off sheet for protection is attached.

In the manufacturing process, by attaching the electrophoretic sheet from which the peel-off sheet is peeled off to the component substrate 28, on which a pixel electrode 21, an electric circuit, and the like are formed, separately manufactured, the display unit 3 is formed. Accordingly, the adhesive agent layer 30 is placed only on the pixel electrode 21 side.

Figure 4:
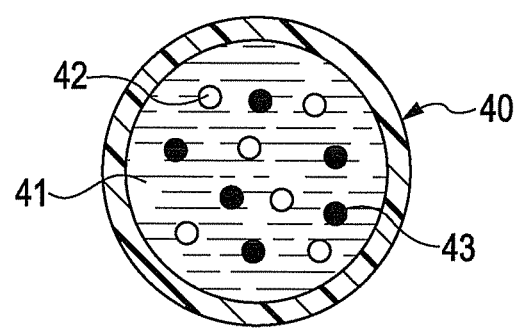
FIG. 4 is a diagram showing the configuration of a microcapsule.

FIG. 4 is a schematic cross-sectional view of the microcapsule 40. The microcapsule 40, for example, has a diameter of about 50 μm and is a sphere-shaped body in which a dispersion medium 41, a plurality of white particles (electrophoretic particles) 42, and a plurality of black particles (electrophoretic particles) 43 are enclosed. The microcapsule 40, as shown in FIG. 3, is pinched by the common electrode 22 and the pixel electrode 21. One or a plurality of microcapsules 40 is arranged inside one pixel 20.

The outer shell portion (wall film) of the microcapsule 40 is formed of an acrylic resin such as polymethylmethacrylate, polyethylmethacrylate, or the like, a high-molecular resin such as, a urea resin, gum Arabic, or the like that has transparency, or the like.

The dispersion medium 41 is a liquid that disperses the white particles 42 and the black particles 43 in the inside of the microcapsule 40. For example, as the dispersion medium 41, water; an alcohol-based solvent (methanol, ethanol, isopropanol, butanol, octanol, methyl cellosolve, or the like); a variety of esters (acetic ethyl, acetic butyl, or the like); ketones (acetone, methylethylketone, methylisobutylketone, or the like); aliphatic hydrocarbon (pentane, hexane, octane, or the like); cycloaliphatic hydrocarbon (cyclohexane, methylcyclohexane, or the like); aromatic hydrocarbon (benzene, toluene, or benzene having a long-chain alkyl group (xylene, hexylbenzene, hebuthylbenzene, octylbenzene, nonylbenzene, decylbenzene, undecylbenzene, dodecylbenzene, tridecylebenzene, tetradecylbenzene, or the like)); halogenated hydrocarbon (methylene chloride, chloroform, carbon tetrachloride, 1,2-dichloroethane, or the like); carboxylate; or the like or other kinds of oils can be used. The above-described materials may be used as a single material or a mixture, and a surfactant or the like may be mixed further thereto.

The white particles 42 are particles (polymer particles or colloids) made of white pigment such as titanium dioxide, zinc flower, or antimony trioxide and, for example, are negatively charged. On the other hand, the black particles 43 are particles (polymer particles or colloids) made of black pigment such as aniline black or carbon black and, for example, are positively charged.

In addition, a charge control agent containing particles of an electrolyte, a surfactant, metal soap, a resin, rubber, oil, varnish, compound, or the like; a dispersant such as a titanium-coupling agent, an aluminum-coupling agent, and a silane-coupling agent; a lubricant; a stabilizing agent; or the like may be added to the above-described pigment, as is needed.

Next, the method of driving the electrophoretic display device 1 according to an embodiment of the invention and the operation of the electrophoretic element 23 will be described with reference to FIGS. 1, 2, 5, and 6.

Figure 5:
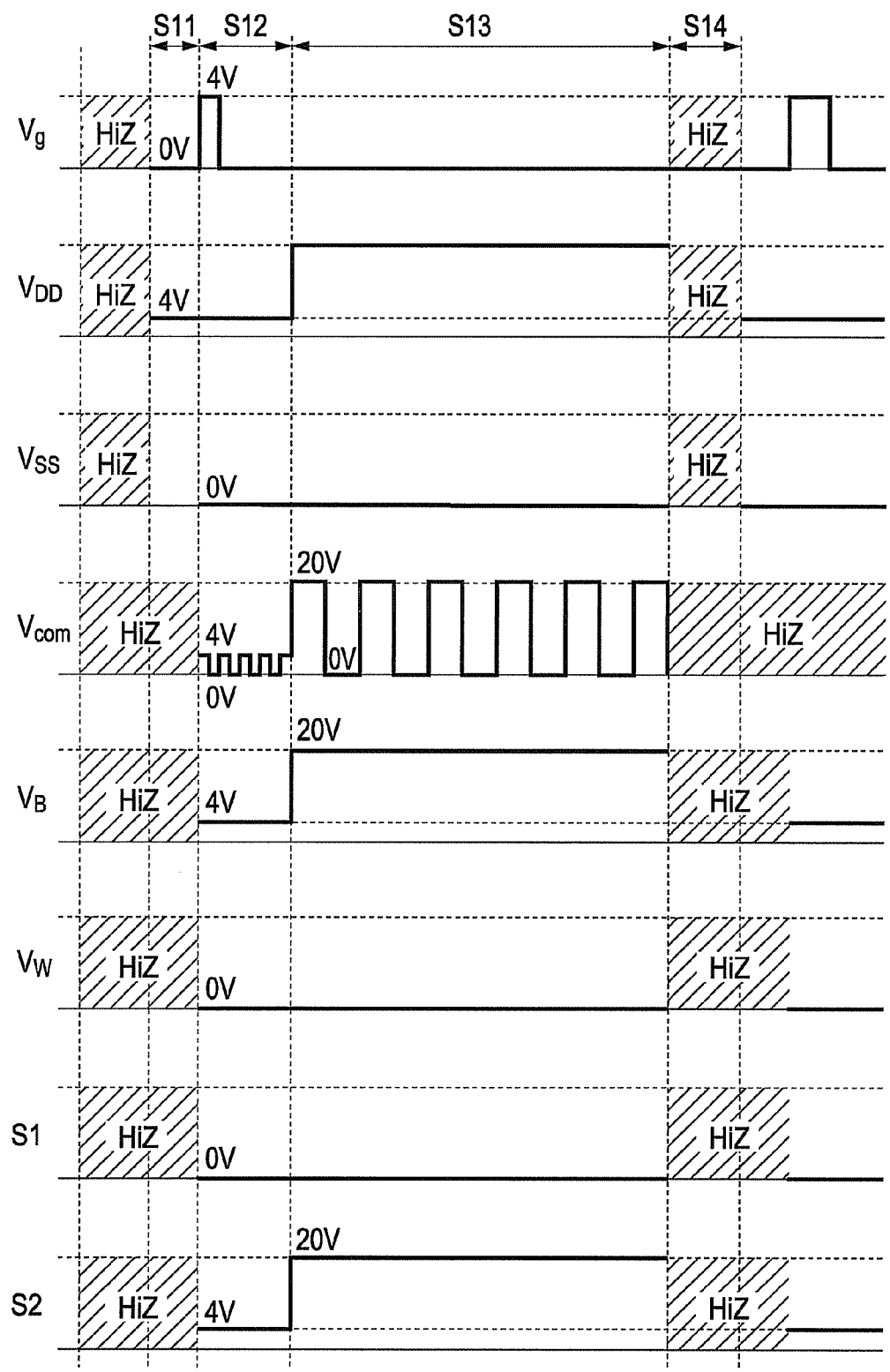
FIG. 5 is a timing chart relating to a method of driving an electrophoretic display device.
Figure 6A:
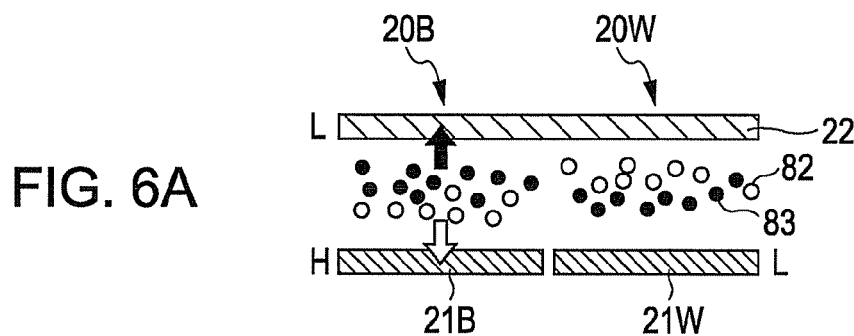
FIGS. 6A, 6B, and 6C are diagrams showing the operation of an electrophoretic element.
Figure 6B:
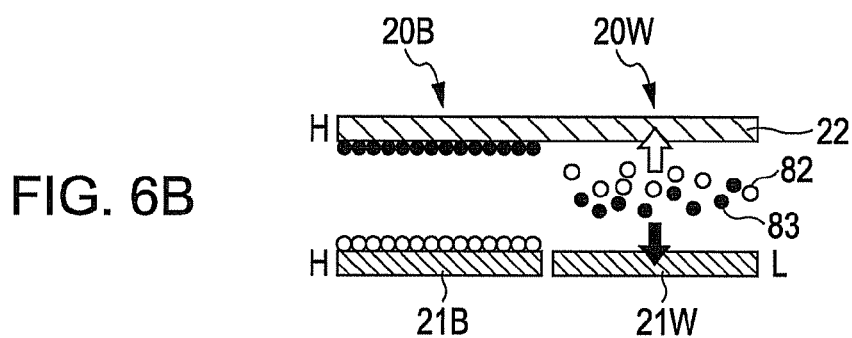
Figure 6C:
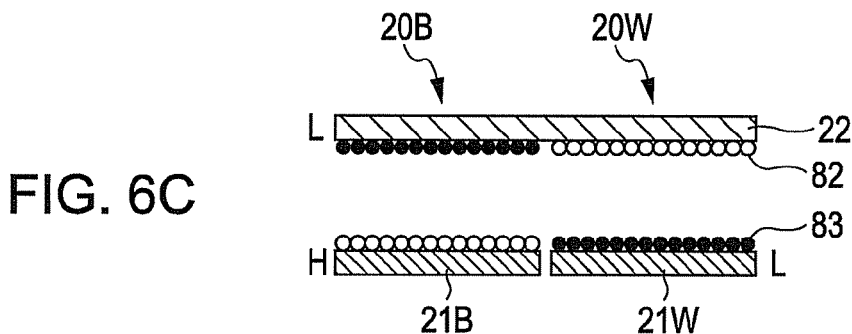

FIG. 5 is a timing chart showing the method of driving the electrophoretic display device 1. FIGS. 6A, 6B, and 6C are diagrams showing detailed operations of the white particles 42 and the black particles 43 in the driving method shown in FIG. 5.

In descriptions below, of the pixels 20 arranged in the display unit 3, a pixel 20B that represents black display and a pixel 20W that represents white display will be described. In FIGS. 5 and 6, for the convenience of description, each constituent element is denoted by assigning a subscript of "B" or "W" to a corresponding reference sign. However, such a subscript is used only for clearly indicating whether the constituent element belongs to the pixel 20B or the pixel 20W and does not have other meaning.

In FIG. 5, the temporal changes in the electric potentials of the scanning line 4, the high electric-potential power source line 13, the low electric-potential power source line 14, the common electrode 22, the pixel electrode 21B of the pixel 20B, and the pixel electrode 21W of the pixel 20W which are shown in FIG. 2 are represented. In FIG. 5, $V_g$ denotes the electric potential of the scanning line 4, $V_{DD}$ denotes the electric potential of the high electric-potential power source line 13, $V_{SS}$ denotes the electric potential of the low electric-potential power source line 14, $V_{com}$ denotes the electric potential of the common electrode 22, $V_B$ denotes the electric potential of the pixel electrode 21B, and $V_W$ denotes the electric potential of the pixel electrode 21W. In FIG. 5, "HiZ" denotes a high impedance state that represents an electrically disconnected state.

In FIGS. 6A to 6C, the forms of movement of the white particles 42 and the black particles 43 in the pixel 20B representing black display and the pixel 20W representing white display are shown.

Hereinafter, the high-level electric potential and the low-level electric potential will be described while being specifically denoted. However, such values of the electric potentials are examples and can be appropriately changed.

First, in Step S11 shown in FIG. 5, wirings of the pixels 20 are electrically connected to the driving circuit, so that a signal can be input thereto. In particular, the low level (0 V) is input to the scanning line 4, the high level (4 V) is supplied to the high electric-potential power source line 13, and the low level (0 V) is supplied to the low electric-potential power source line 14. Accordingly, the latch circuit 25 is in the power-on state and can store image data that is input from the data line 5.

Next, in Step S12 (image signal inputting step), a selection signal (the high level of 4 V) is input to the scanning line 4 for a predetermined period. Accordingly, the pixel switching element 24 is turned on, and the image data is input to the latch circuit 25 from the data line 5. As a result, the latch circuit 25 stores the input image data. In the pixel 20B representing black display, the low level is input as the image data. Accordingly, the high level is output from the output terminal P2 of the latch circuit 25, and the second transmission gate 37 is turned on. As a result, the high level (4 V) of the second control line 12 is applied to the pixel electrode 21B.

On the other hand, in the pixel 20W representing white display, the high level is input as the image data, and the low level is output from the output terminal P2 of the latch circuit 25. Accordingly, the first transmission gate 36 is turned on. As a result, the low level (0 V) of the first control line 11 is applied to the pixel electrode 21W.

Thereafter, in Step S13, the electric potential of the high electric-potential power source line 13 is lifted up from 4 V to 20 V. At this moment, the electric potential of the low electric-potential power source line 14 is maintained at 0 V. Accordingly, the electric potential output from the output terminal P2 of the latch circuit 25B to the pixel 20B representing black display is raised to the high level (20 V). To the pixel 20B representing black display, the low level is input as the image data, and the high level is output from the output terminal P2 of the latch circuit 25. Accordingly, the second transmission gate 37 is turned on. As a result, the high level (20 V) of the second control line 12 is applied to the pixel electrode 21B, and the electric potential of the pixel electrode 21B is raised from 4 V to the high level of 20V. On the other hand, to the pixel 20W representing white display, the high level is input as the image data, and the low level is output from the output terminal P2 of the latch circuit 25. Accordingly, the first transmission gate 36 is turned on. As a result, the low level (0 V) of the first control line 11 is applied to the pixel electrode 21W. Therefore, the electric potential applied to the pixel electrode 21W is not changed but maintained at the low level. Step S13 corresponds to a contrast raising period.

In Step S13, a reference pulse having the rectangular shape, in which a period of the low level (0 V) and a period of the high level (20 V) are repeated, is input to the common electrode 22 for a plurality of periods (four periods in the figure). Hereinafter, such a driving method is denoted by "common swing driving". The common swing driving can be defined as a driving method in which a pulse, in which the period of the high level (H) and the period of the low level (L) are repeated, is applied to the common electrode 22 at least for one period or more during the period in which a display image is overwritten.

According to such a common swing driving method, the electric potentials applied to the pixel electrode and the common electrode can be controlled by using two values of the high level (H) and the low level (L). Accordingly, low-voltage driving can be implemented, and the circuit configuration can be simplified. In addition, in the case where TFTs (Thin Film Transistors) are used as the switching elements of the pixel electrodes 21 (21B and 21W), there is an advantage that the reliability of the TFTs can be acquired by achieving low-voltage driving.

When the image displaying operation of Step S13 is completed, the process proceeds to Step S14. In Step S14, the high electric-potential power source line 13, the low electric-potential power source line 14, and the scanning line 4 are in the high-impedance state, and the circuits thereof are in the OFF state. Accordingly, the pixel electrodes 21W and 21B are also in the high impedance.

By performing the process of Steps S11 to S14, white display and black display can be performed in each pixel 20. In addition, by repeating the process of Steps S11 to S14, the displayed image can be sequentially updated.

In this embodiment, in addition to the above-described driving method, an operation for inputting a reference pulse having a rectangular shape, in which the period of a low level (0 V) and the period of a high level (4 V) are repeated, to the common electrode 22 for a plurality of periods is performed during a period in which the selection signal (the high level of 4 V) is input to the scanning line 4 in Step S12. The operation of the pixels 20B and 20W at this moment will be described with reference to the operation of the pixels 20B and 20W at the time of the common swing operation.

First, the operation of the pixels 20B and 20W in the common swing driving will be described with reference to FIGS. 6A, 6B, and 6C.

FIG. 6A shows the appearance at the time when the application of the low level (L; 0 V) to the common electrode 22 is the first period of the pulse in the common swing driving. In the pixel 20B, the high level (H; 20 V) is applied to the pixel electrode 21B, and the low level (L; 0 V) is applied to the common electrode 22. Accordingly, an electric field is formed between the pixel electrode 21B and the common electrode 22 in the vertical direction, and the positively-charged black particles 43 are attracted to the common electrode 22. On the other hand, the negatively-charged white particles 42 are attracted to the pixel electrode 21B. At this moment, since both the common electrode 22 and the pixel electrode 21W of the pixel 20W have the low level (L; 0 V), there is not any electric field generated between the above-described electrodes, and accordingly, the particles are not moved.

FIG. 6B shows the appearance at the time when the application of the high level (H; 20 V) to the common electrode 22 is the first period of the pulse. In the pixel 20W, the low level (L; 0 V) is applied to the pixel electrode 21W, and the high level (H; 20 V) is applied to the common electrode 22. Accordingly, an electric field is formed between the pixel electrode 21W and the common electrode 22 in the vertical direction, and the negatively-charged white particles 42 are attracted to the common electrode 22. On the other hand, the positively-charged black particles 43 are attracted to the pixel electrode 21W. At this moment, since both the common electrode 22 and the pixel electrode 21B of the pixel 20B have the high level (H; 20 V), there is not any electric field generated between the above-described electrodes, and accordingly, the particles are not moved.

FIG. 6C shows the appearance right after the application of the one period of the pulse in the common swing driving. In the pixel 20B, the black particles 43 are collected on the common electrode 22 side, and the white particles 42 are collected on the pixel electrode 21B side, whereby black display of the common electrode 22 side that is the display surface is observed. In the pixel 20W, the white particles 42 are collected on the common electrode 22 side, and the black particles 43 are collected on the pixel electrode 21W side, whereby white display of the common electrode 22 side that is the display surface is observed.

The appearance of the driving for the one period of the pulse has been described as above. By performing the above-described driving for a plurality of periods, the movement of the white particles 42 and the black particles 43 can be performed more assuredly. Accordingly, contrast can be increased. In addition, it is preferable that the number of periods and the frequency for the common swing driving are appropriately set in accordance with the specifications or characteristics of the electrophoretic element. In addition, for example, by replacing the pigments used in the white particles 42 and the black particles 43 with red, green, and blue pigments and the like, the red color, the green color, the blue color, and the like can be displayed in the display unit 3.

On the other hand, in the operation for inputting the reference pulse having the rectangular shape, in which the period of the low level (0 V) and the period of the high level (4V) are repeated, for a plurality of periods to the common electrode 22 in Step S12, in the pixel 20B, an electric potential difference between the pixel electrode 21B and the common electrode 22 is generated when the electric potential of the common electrode 22, to which a pulse-shaped signal is input, is 0 V. Accordingly, the black particles 43 are attracted to the common electrode 22, and the white particles 42 are attracted to the pixel electrode 21B. As a result, black is displayed in the corresponding pixel 20B. In addition, display in pixels in which image signals have been written is updated in synchronization with sequential selection of the scanning lines Y1, Y2, . . . , Ym (sequential display). In the above-describe driving, an electric potential difference between the pixel electrode 21B and the common electrode 22 is small, and the generated electric field is weak, compared to those in the case of Step S14. Accordingly, the black particles 43 and the white particles 42 are moved slower than those in Step S13. As a result, although not a perfect black color but a grey color close to the black color is displayed, the display is performed so as to be visually recognized as the black color.

In addition, in the pixel 20W, an electric potential difference between the pixel electrode 21W and the common electrode 22 is generated when the electric potential of the common electrode 22, to which a pulse-shaped signal is input, is 4 V. Accordingly, the white particles 42 are attracted to the common electrode 22, and the black particles 43 are attracted to the pixel electrode 21W. As a result, white is displayed in the corresponding pixel 20B. In addition, display in pixels in which image signals have been written is updated in synchronization with sequential selection of the scanning lines Y1, Y2, . . . , Ym (sequential display). In the above-describe driving, an electric potential difference between the pixel electrode 21W and the common electrode 22 is small, and the generated electric field is weak, compared to those in the case of Step S13. Accordingly, the white particles 42 and the black particles 43 are moved slower than those in Step S14. As a result, although not a perfect white color but a grey color close to the white color is displayed, the display is performed so as to be visually recognized as the white color.

Rewriting of Display Color

Next, an operation performed when the color displayed in each pixel is rewritten will be described.

Figure 7:
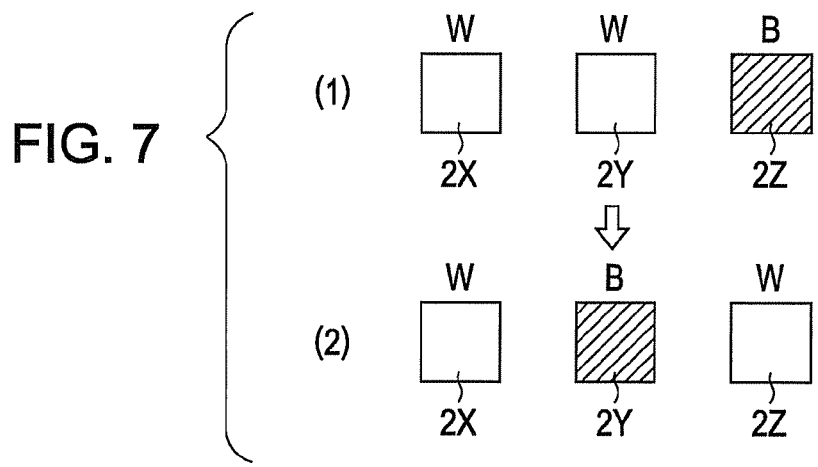
FIG. 7 is a plan view of adjacent pixels.

FIG. 7 is a plan view of three adjacent pixels 2X to 2Z out of pixels 2 that are arranged in the display unit 3. In this embodiment, as shown in FIG. 7, the case where the state in which the pixel 2X displays white (W), the pixel 2Y displays white, and the pixel 2Z displays black (B) (hereinafter, referred to as "State (1)") is changed to the state in which the pixel 2X displays white, the pixel 2Y displays black, and the pixel 2Z displays white (hereinafter, referred to as "State (2)") will be described.

Figure 8:
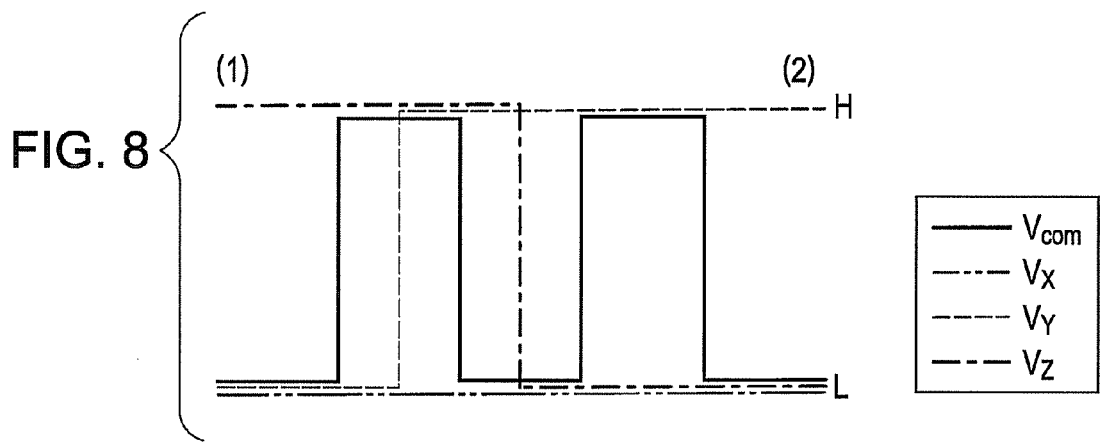
FIG. 8 is a plan view of adjacent pixels.

FIG. 8 is a diagram showing the waveforms of signals supplied to the common electrode 22 and the pixels 2X to 2Z during the image signal inputting period.

As shown in the figure, the high-level signal (H) and the low-level signal (L) are continuously supplied to the common electrode 22 in an alternating manner for each fixed time ($V_{com}$). The pixel 2X continues to display white over State (1) to State (2). Accordingly, the low-level signal is continuously supplied to the pixel electrode belonging to the corresponding pixel 2X ($V_X$).

The pixel 2Y changes its display from white display to black display over State (1) to State (2). Accordingly, the pixel electrode belonging to the corresponding pixel 2Y is changed from the state in which a low-level signal is supplied to the state in which a high-level signal is supplied ($V_Y$). As shown in FIG. 8, it is preferable that the time of change in this signal is within a period in which the signal supplied to the common electrode 22 is in the high level.

In the case where the signal $V_Y$ supplied to the pixel electrode within this period is shifted from the low-level signal to the high-level signal, when the signal supplied to the common electrode 22 is changed from the high-level signal to the low-level signal, an electric potential difference is generated between the common electrode 22 and the pixel electrode of the pixel 2Y. In such a case, in accordance with the electric potential difference, the black particles 43 are attracted to the common electrode, and the white particles 42 are attracted to the pixel electrode. Accordingly, the pixel 2Y displays black.

The pixel 2Z changes its display from black display to white display over State (1) to State (2). Accordingly, the pixel electrode belonging to the corresponding pixel 2Z is changed from the state in which a high-level signal is supplied to the state in which a low-level signal is supplied ($V_Z$). As shown in FIG. 8, it is preferable that the time of change in this signal is within a period in which the signal supplied to the common electrode 22 is in the low level.

In the case where the signal $V_Z$ supplied to the pixel electrode within this period is shifted from the high-level signal to the low-level signal, when the signal supplied to the common electrode 22 is changed from the low-level signal to the high-level signal, an electric potential difference is generated between the common electrode 22 and the pixel electrode of the pixel 2Z. In such a case, in accordance with the electric potential difference, the black particles 43 are attracted to the pixel electrode, and the white particles 42 are attracted to the common electrode 22. Accordingly, the pixel 2Z displays white.

When the display unit is viewed as a whole, within the period in which the common electrode 22 is in the high level, image signals only for updating pixels having the pixel electrodes that are changed from the low level to the high level are written. On the other hand, within the period in which the common electrode 22 is in the low level, image signals only for updating pixels having the pixel electrodes that are changed from the high level to the low level are written. As a result, the image signals for black display are input when the common electrode 22 is in the high level, and the image signals for white display are input when the common electrode 22 is in the low level.

As described above, according to this embodiment, leakage currents between the pixels 2 are suppressed by controlling the first control line 11 and the second control line 12. Accordingly, the reliability of the product can be improved. In addition, according to this embodiment, during the image signal inputting period in which the image signal is input to the SRAM 25 through the driving TFT 24, the switching circuit 35 is operated based on the output of the SRAM 25, and the first control line 11 and the second control line 13 are connected to the pixel electrode 21. Accordingly, in a state in which the electric potential of the first control line 11 is in the high level, and the electric potential of the second control line 12 is in the low level, the electric potential of the common electrode 22 is alternately changed to the high level and the low level. As a result, the images can be sequentially displayed without markedly increasing the scale of the circuit.

The technical scope of the invention is not limited to the above-described embodiment and an appropriate change may be added thereto within the range while not departing from the basic idea of the invention.

Figure 9:
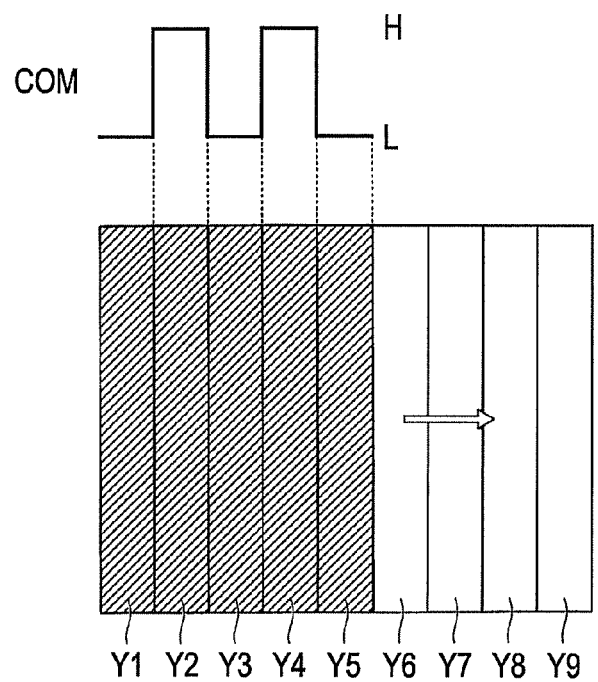
FIG. 9 is a diagram showing the appearance of driving of an electrophoretic display device.
Figure 10:
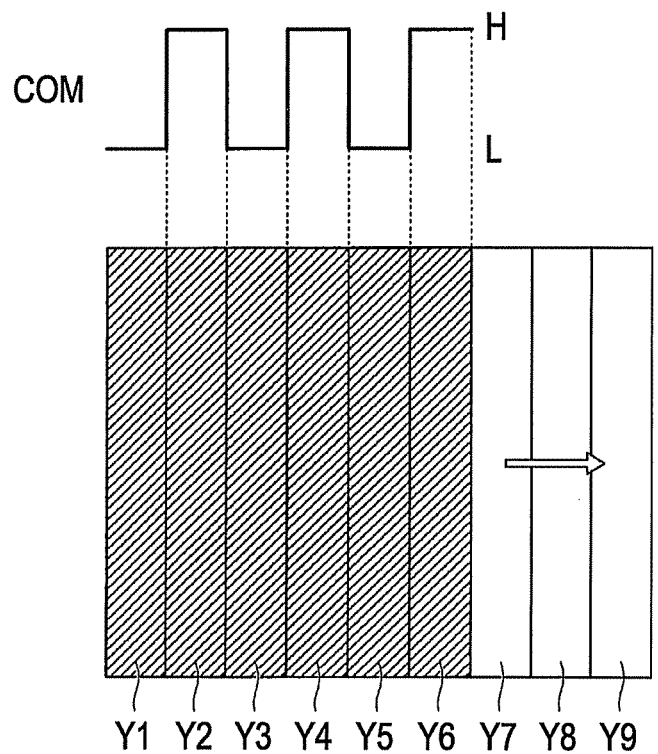
FIG. 10 is a diagram showing the appearance of driving of an electrophoretic display device.

For example, as shown in FIGS. 9 and 10, the electric potential of the common electrode 22 may be configured to be changed in synchronization with the input of image signals to the pixel groups Y1 to Y9, which respectively belong to one line of the matrix, out of the pixels 2 of the display unit. In addition, in FIGS. 9 and 10, for the convenience of display, a partial area (the pixel groups Y1 to Y9) of the display unit is shown, and the extending direction of the scanning line is represented in the vertical direction (the horizontal direction in FIG. 1) in the figure. The pixel groups Y1 to Y9 correspond to the reference signs of the scanning lines shown in FIG. 1. For example, FIG. 9 shows a state in which image signals are input to the SRAMs of the pixels belonging to the pixel groups Y1 to Y5. In the figure, a low-level signal is supplied to the common electrode 22.

On the contrary, as shown in FIG. 10, a high-level signal is supplied to the common electrode 22 in synchronization with the input of image signals to the SRAMs of pixels belonging to the pixel group Y6. In FIGS. 9 and 10, only the case of the pixel group Y6 is shown. However, for other pixel groups out of the pixel groups Y1 to Y9, the same driving is performed. By performing the above-described driving, the high level or the low level of the common electrode 22 is changed for each of the pixel groups Y1 to Y9. Accordingly, rewriting of an image is performed for each of the pixel groups Y1 to Y9. However, the change from white color to black color is displayed when the common electrode 22 is in the high level after the writing of the image signal, and the change from black color to white color is displayed when the common electrode 22 is in the low level after the writing of the image signal. Accordingly, it looks like each two lines out of the pixel groups Y1 to Y9 are sequentially updated. Alternatively, pixel groups, which belong to a plurality of lines, out of the pixels 2 of the display unit may be synchronized with the inputting of the image signals.

Figure 11:
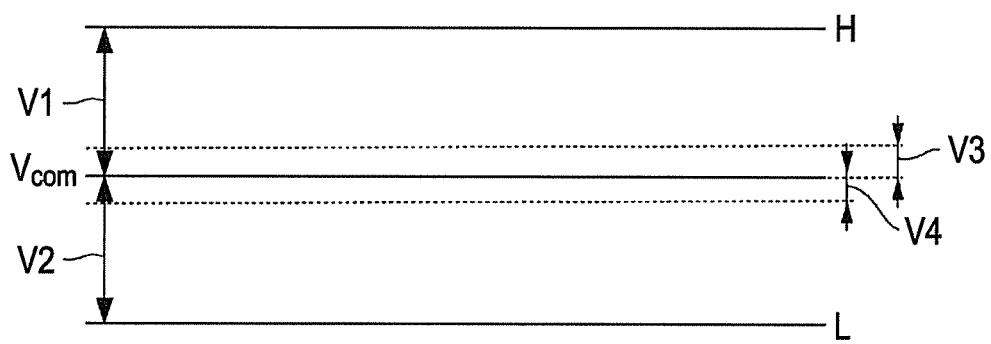
FIG. 11 is a diagram showing signal waveforms at the time when the electrophoretic display device is driven.

As shown in FIG. 11, the electric potential of the common electrode 22 may be fixed in the ±30% range of the median of the high-level electric potential and the low-level electric potential that are supplied to the pixel electrode 21. For the case shown in FIG. 11, the signal ($V_{com}$) supplied to the common electrode 22 is fixed in the range V1=V2, V3≦0.3× V1, and V4=0.3×V2. Accordingly, for example, display of an intermediary gray scale such as a grey color in the black and white display can be performed. In addition, in the ±30% range, the electric potential of the common electrode can be adjusted in accordance with the characteristics (ease of output of white color and black color) of the electrophoretic display device.

Here, the electric potential of the common electrode 22 is not limited to the range within the ±30% of the above-described median electric potential. Thus, any intermediary electric potential between the high level (H) and the low level (L) may be used. In such a case, the balance of the electric potential is improved the most.

Electronic Apparatus

Next, an electronic apparatus according to an embodiment of the invention will be described.

Figure 12A:
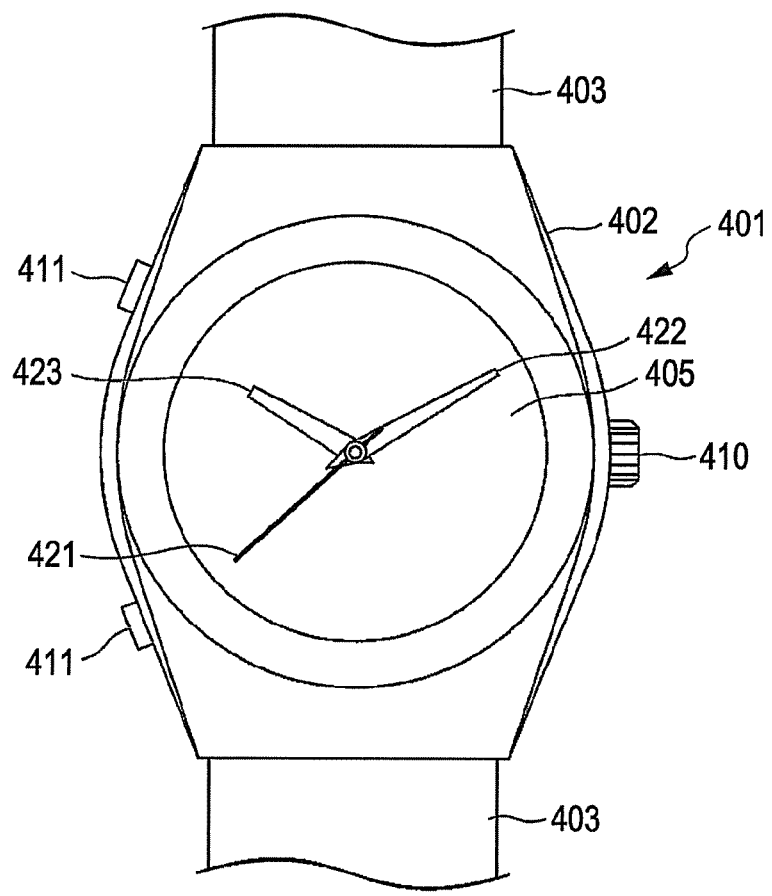
FIGS. 12A and 12B are diagrams showing examples of electronic apparatuses having an electrophoretic display device according to an embodiment of the invention.

FIG. 12A is a front view of a wrist watch 401 having the electrophoretic display device 1 according to an embodiment of the invention.

The wrist watch 401 includes a watch case 402 and a pair of bands 403 that are connected to the watch case 402. On the front face of the watch case 402, a display device 405 that is configured by the electrophoretic display device 1 according to an embodiment of the invention, the second hand 421, the minute hand 422, and the hour hand 423 are mounted. On the side of the watch case 402, a winder 410 and an operation button 411 used as manipulation bodies are mounted.

Figure 12B:
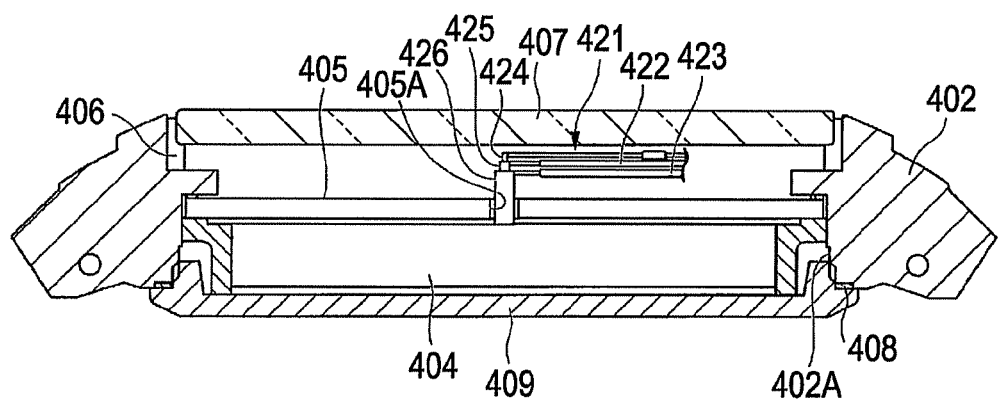

FIG. 12B is a cross-sectional view of the side of the wrist watch 401. Inside the watch case 402, a housing unit 402A is mounted. In the housing unit 402A, a movement 404 and a display device 405 are housed. On one end side (the front side of the watch) of the housing unit 402A, a transparent cover 407 formed from glass or a resin is mounted. In addition, on the other end side (the rear side of the watch) of the housing unit 402A, a rear lid 409 is screwed through a packing 408, and the watch case 402 is sealed by the rear lid 409 and the transparent cover 407.

The movement 404 includes a hand moving mechanism (not shown) to which analog indicatory hands that are configured by the second hand 421, the minute hand 422, and the hour hand 423 are connected. This hand moving mechanism rotates the analog indicatory hands 421 to 423 so as to serve as a time displaying unit that displays a set time.

The display device 405 is disposed on the side of the movement 404 that is located on the front side of the watch and configures the display unit of the wrist watch 401. Here, the shape of the display surface of the display device 405 is a circle. However, the display surface of the display device 405 may be in other shapes such as an octagon and a hexadecagon. In the center portion of the electrophoretic display device 405, a through hole 405A is formed that passes through the front and rear sides of the electrophoretic display device 405. In the through hole 405A, the shafts of the second wheel 424, the center wheel 425, and the tubular wheel 426 of the hand moving mechanism (not shown) of the movement 404 are inserted. In the front ends of the shafts, the second hand 421, the minute hand 422, and the hour hand 423 are mounted.

The electrophoretic display device according to an embodiment of the invention may be applied to an electronic apparatus other than the watch.

Figure 13:
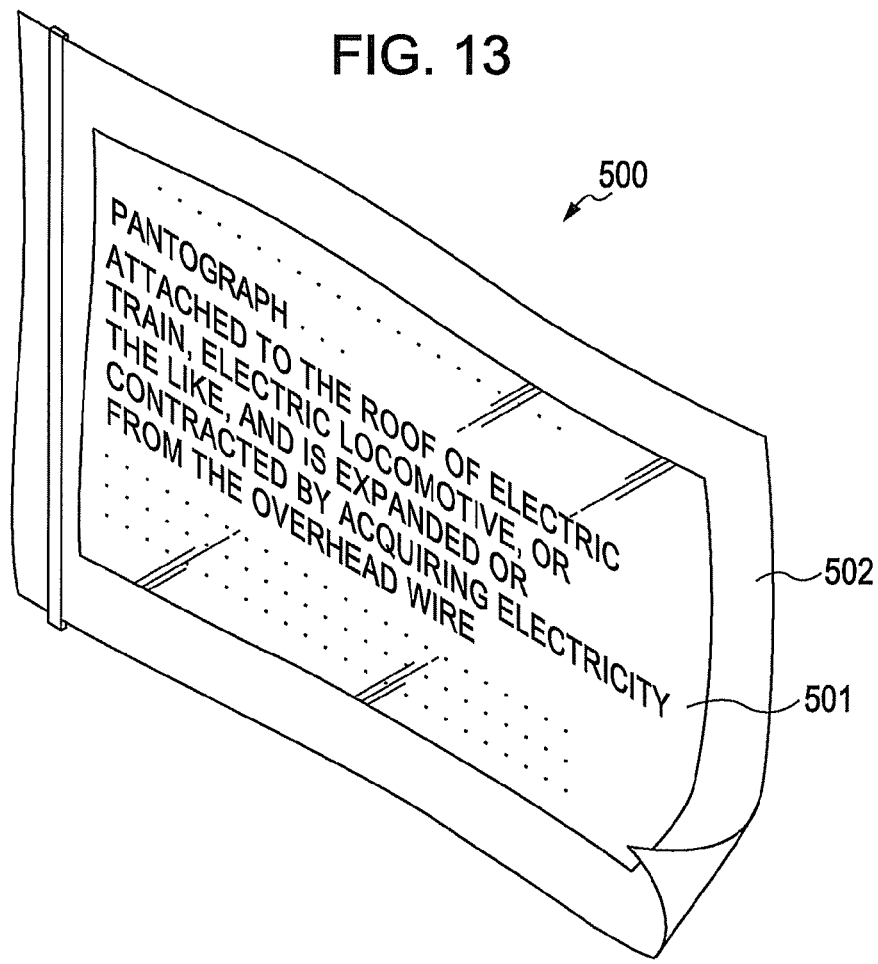
FIG. 13 is a diagram showing an example of an electronic apparatus having an electrophoretic display device according to an embodiment of the invention.

FIG. 13 is a perspective view of an electronic paper sheet 500. The electronic paper sheet 500 includes the electrophoretic display device, according to an embodiment of the invention, which is used as a display unit 501. The electronic paper sheet 500 has flexibility and is configured by a main body 502 that is formed of a sheet that has the same texture and flexibility as those of a typical paper sheet and can be updated.

Figure 14:
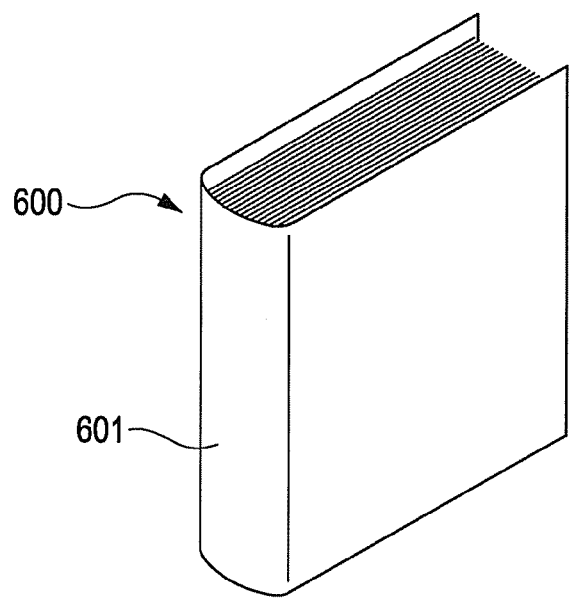
FIG. 14 is a diagram showing an example of an electronic apparatus having an electrophoretic display device according to an embodiment of the invention.

FIG. 14 is a perspective view showing the configuration of an electronic notebook 600. The electronic notebook 600 is formed by binding a plurality of the electronic paper sheets 500 shown in FIG. 13 so as to be inserted into a cover 601. The cover 601 includes a display data inputting unit not shown in the figure, to which display data, for example, transmitted from an external device, is input. Accordingly, the display contents can be changed or updated in accordance with the display data in the state in which the electronic paper sheets are bound.

By including the electrophoretic display device according to an embodiment of the invention, the wrist watch 401, the electronic paper sheet 500, and the electronic notebook 600 that are described above have the display unit that has superior reliability.

Pen Input Device (1)

Next, another embodiment of the invention will be described. In this embodiment, the case will be described where the electrophoretic display device is mounted in an information processing system 1000 that includes a pen input device. In this embodiment, a process will be described for the case where the display of the entire screen of the electrophoretic display device is changed by using the pen input device.

Figure 15:
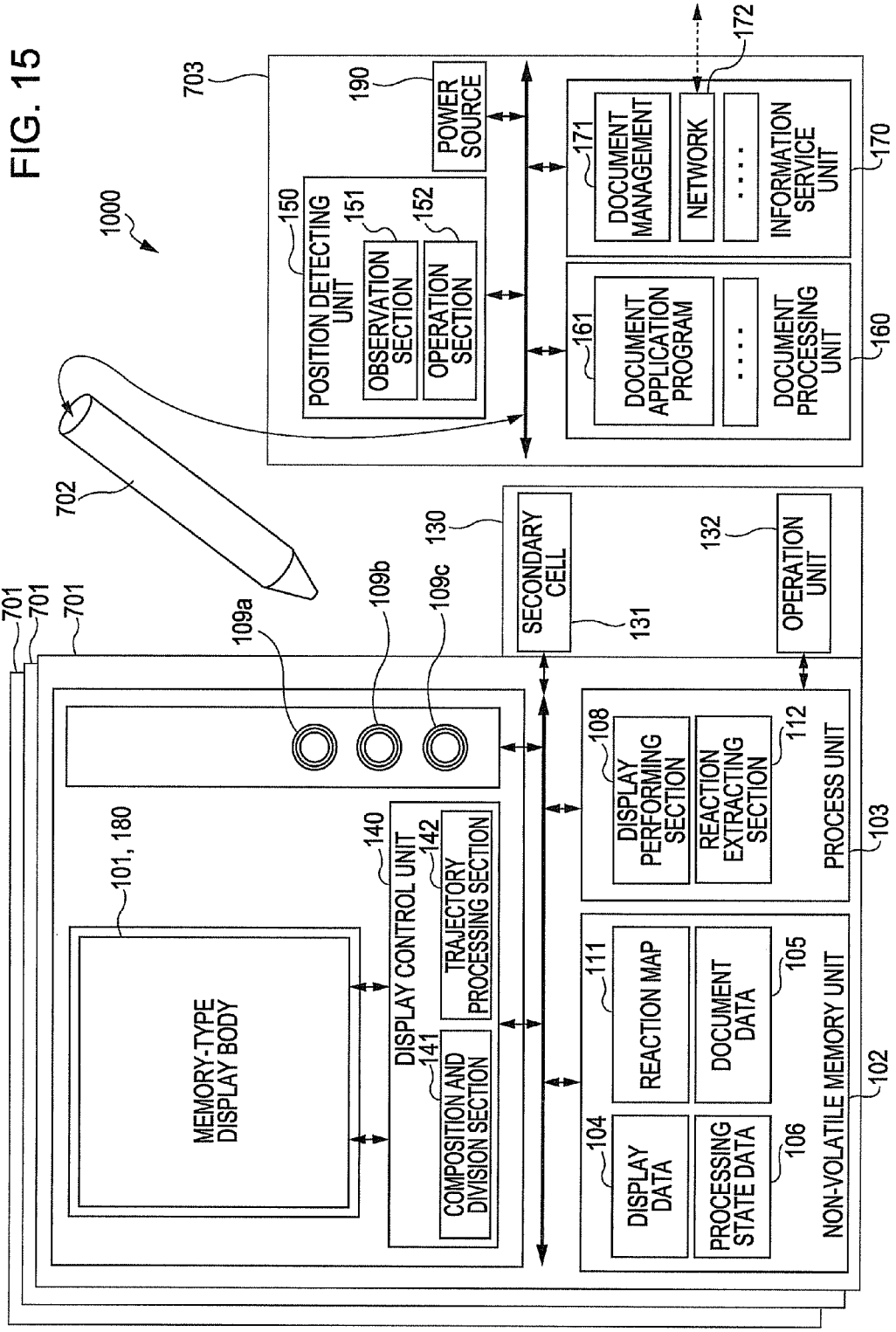
FIG. 15 is a diagram showing the configuration of an information processing system according to another embodiment of the invention.

FIG. 15 is a diagram showing the information processing system 1000 according to this embodiment. The configuration shown in the figure is formed by a host device 703 and a client device 701 that is provided for display of the process result of the host device 703 and the operation of the host device 703. In this embodiment, the host device 703 and the client device 701 can be connected to each other in accordance with the operation, and a plurality of the client devices 701 can be used in an alternating manner. In the host device 703, the process proceeds in accordance with driven events that are accompanied by the operation of the client device 701.

In addition, in this embodiment, a communication unit that transmits and receives signals between the host device and the client device is included. The communication unit according to this embodiment includes operation buttons 109a, 109b, and 109c, a pen 702 that is installed on the host device 703 side in a wired or a wireless manner and is a contact member which is brought into contact with the operation buttons 109a to 109c, and a process unit 103 of the client device 701 to be described later. The process unit 103 outputs communication information corresponding to the touched operation button when the operation buttons 109a, 109b, and 109c are touched.

In this embodiment, communication is made between the client device 701 and the host device 703 in the case where the pen 702 is brought into contact (touch) with the operation buttons 109a, 109b, and 109c. However, this embodiment is not limited to the configuration in which communication is performed based on a touch operation. Thus, a configuration in which communication is acquired by locating the client device 701 and the host device 703 in a very short predetermined distance or less from each other.

In addition, the communication between the client device 701 and the host device 703 is not limited to the configuration in which the operation buttons 109a to 109c and the pen 702 are used. Thus, the communication between the client device 701 and the host device 703 may be configured to be made all the time by combining both devices by using a communication cable, a wireless LAN, or the like.

Hereinafter, the client device 701 and the host device 703 will be described respectively.

Client Device

The client device 701 is configured by a thin-type display and a relatively simple device that is used for displaying an image (including text and drawings) on the display. The configuration formed by the display and the above-described device will be referred to as an electronic paper sheet in this embodiment.

Figure 16:
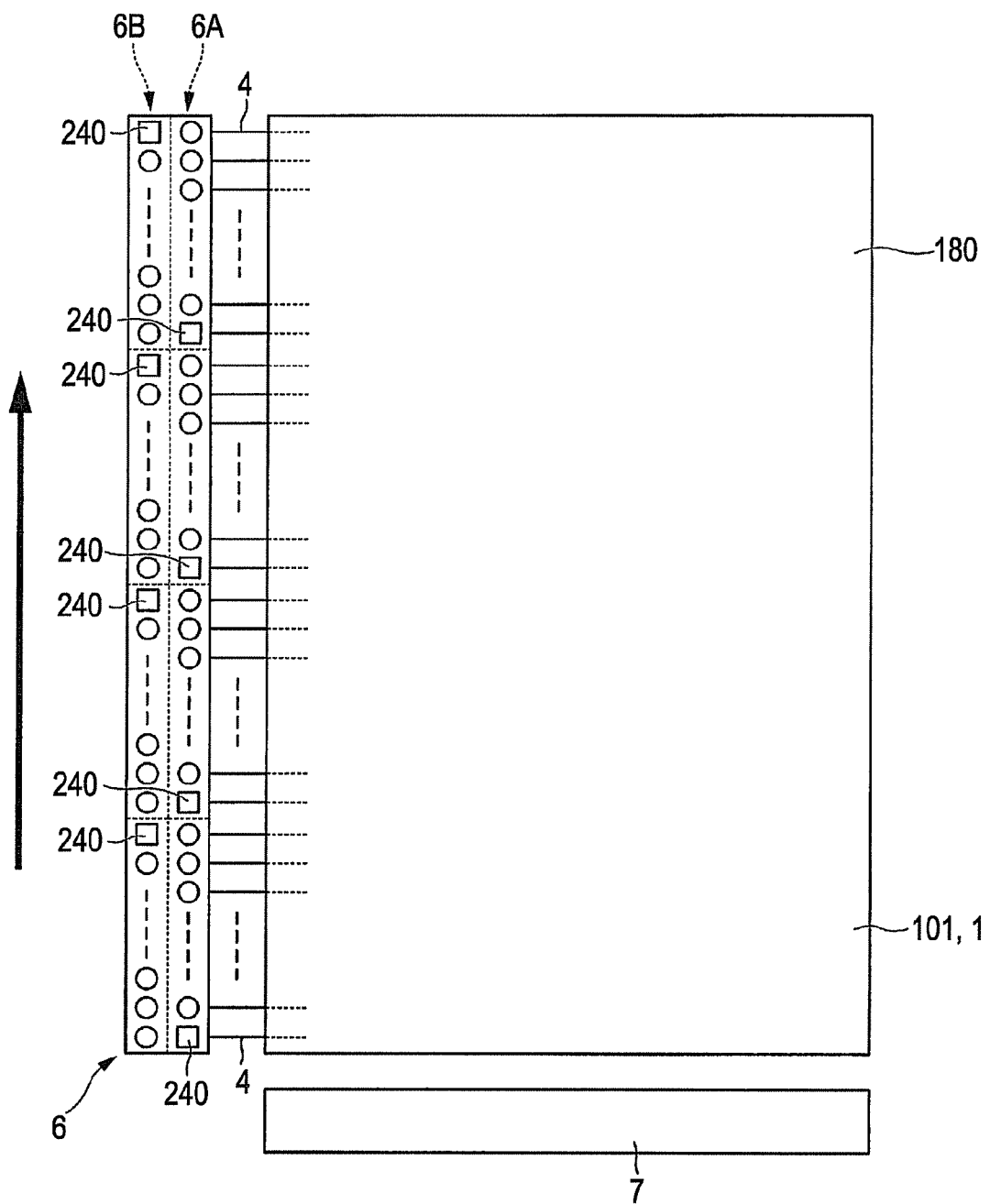
FIG. 16 is a diagram showing the configuration of a memory-type display body according to an embodiment of the invention.

The client device 701 includes a memory-type display body 101 that serves as a display. As the memory-type display body 101, the above-described electrophoretic display device 1 can be appropriately used. FIG. 16 is a schematic diagram showing the memory-type display body 101 according to this embodiment.

As shown in FIG. 16, a scanning line driving circuit 6 that is installed to the memory-type display body 101 has a plurality of start pulse inputting terminals 240 to which start pulses are input for sequentially starting selection operations. The start pulse inputting terminals 240, for example, are disposed in two rows in the vertical direction (the arrangement direction of the scanning lines 4) of the scanning line driving circuit 6.

When a start pulse is input to the start pulse inputting terminals 240 located on the right row in the figure (an area denoted by reference sign 6A), the scanning lines 4 are selected in the forward direction (for example, from the lower side toward the upper side in FIG. 16). On the other hand, when a start pulse is input to the start pulse inputting terminals 240 located on the left row in the figure (an area denoted by reference sign 6B), the scanning lines 4 are selected in the reverse direction (for example, from the upper side toward the lower side in FIG. 16). As described above, the scanning line driving circuit 6 according to this embodiment can sequentially select the scanning lines 4 in both arrangement directions.

The start pulse inputting terminals 240 located on the right row in the figure, for example, are disposed on lower end portions of each portion of the scanning line driving circuit 6 when the scanning line driving circuit 6 is divided into four portions in the arrangement direction of the scanning lines 4. The start pulse inputting terminals 240 that are located on the left row in the figure are disposed in the upper end portion of each portion. To a plurality of the start pulse inputting terminals 240, a start pulse is selectively input. The sequential selection operation that is performed by the scanning line driving circuit 6 for the scanning lines 4 is sequentially performed from the scanning line 4 corresponding to the start pulse inputting terminal 240 to which the start pulse is input.

In addition, in the scanning line driving circuit 6 according to this embodiment, the start pulse inputting period is over a plurality of periods. Accordingly, in this embodiment, in the start pulse inputting period, a plurality of the scanning lines 4 is selected, whereby the scanning signal is simultaneously input to the plurality of the scanning lines 4.

Referring back to FIG. 15, in this embodiment, a transparent touch panel 180 is installed to the memory-type display body 101. As the transparent touch panel 180, for example, a resistive film-type configuration may be used in which a lattice electrode is arranged on the memory-type display body 101 and a change in the electrical resistance that is generated due to conduction at a point touched by an operator is detected.

In addition, as the touch panel 180, the ultrasonic surface acoustic wave type or the infrared ray shielding type may be used in which a generation unit for generating ultrasonic waves or infrared rays on the memory-type display body 101 and a detection unit for detecting a change in the ultrasonic wave or the infrared ray due to a pen 702 or the like that is brought into contact with or placed adjacent to the transparent touch panel 180 are arranged and a point designated by an operator is detected by screening of the ultrasonic wave or the infrared wave. Furthermore, the electrostatic capacitance type may be used in which touch is detected by detecting a change in the electrostatic capacitance generated when an operator touches the memory-type display body 101 with his finger or the like.

In this embodiment, hereinafter, the point that represents the detected position on the transparent touch panel 180 is referred to as a touch point. In addition, the information that represents the position of the touch point is referred to as positional information.

Such a transparent touch panel 180 serves as a position detecting unit of the client device 701 that detects positional information designated (input) on the memory-type display body 101 according to this embodiment. In addition, the positional information designated on a display that is described in this embodiment is not limited to a point that is directly designated on the memory-type display body 101 and includes positional information designated by a touch panel as a body separated from the memory-type display body 101 in which coordinates corresponding to the coordinates on the memory-type display body 101 are set.

In addition, as the position detecting unit of this embodiment, a transparent touch panel can be used which has a configuration different from any of the above-described transparent touch panels. For the position detection performed on the client device 701 side, high precision is particularly not required. Accordingly, when the type of the transparent touch panel is selected, the precision of detection and the size, the cost, and the lightness of the device must be considered together.

The operation buttons 109*a*, 109*b*, and 109*c* of the client device 701 are installed in correspondence with the type of the operator's operation for the client device 701. The type of the operation, for example, indicates the update (page skipping) of a screen displayed in the memory-type display body 101 or the like.

The operation buttons 109*a* to 109*c* become the communication interface between the client device 701 and the host device 703 together with the pen 702 of the host device 703 to be described later. As a local communication method between the operation buttons 109*a* to 109*c* and the pen 702, a method using light such as infrared rays, a method using electromagnetic waves, a method using electromagnetic induction, or the like may be used. In this embodiment, description will be made based on the case where a method using light is used.

Here, the operation buttons 109*a* to 109*c* include an optical communication module that has an infrared ray emitting and receiving portion. In addition, the pen 702 includes an infrared emitting portion that emits infrared rays, an infrared ray receiving portion that receives reflective light of the emitted infrared rays, and an image pickup optical system that performs image formation of the reflected light in the infrared ray receiving portion.

In addition, the operation buttons 109*a* to 109*c* and the pen 702 include a coil (electromagnetic coupling portion (an electricity transmitting portion and an electricity receiving portion) for supplying electricity). By lightly pressing (touching) the pen 702 against the operation buttons 109*a* to 109*c*, the antenna coils of the operation buttons 109*a* to 109*c* and the pen 702 are coupled electromagnetically, whereby power is supplied from the side of the pen 702 and the host device 703 to the client device 701. Next, the optical communication modules of the operation buttons 109*a* to 109*c* and the infrared emitting portion and the infrared ray receiving portion of the pen 702 are in a communicatable state, and a signal for determining the touched operation button is generated. In this embodiment, the process unit 103 generates communication information corresponding to the generated signal, and the communication information is transmitted to the host device 703 through the pen 702.

According to this embodiment in which the input and output of the information between the client device 701 and the host device 703 is performed by using the infrared ray, communication can be performed at a high speed (16 Mbps and the like) with low power consumption, compared to the case where communication is performed by using the electromagnetic induction. In addition, the affect on the communication can be suppressed for the case where electricity is supplied to the client device 701 by arranging electromagnetic coupling.

In addition, according to this embodiment, while a communicatable state is formed by touching the operation buttons 109*a* to 109*c*, the communication between the host and the client is not started by touching on the client device 701 other than the operation buttons 109a to 109c. In terms of touching an arbitrary position located on the memory-type display body 101 of the above-described client device 701, only detection of the position and storage of the detection result are performed.

In other words, according to this embodiment, a coordinate pattern (positional information code) is set in advance in the memory-type display body 101, the pattern is irradiated by the infrared emitting portion, and the coordinate pattern of the memory-type display body 101 can be optically read out by the infrared ray receiving portion. In such a configuration, in this embodiment, the coordinates of a point located on the memory-type display body 101 that is touched by the pen 702 can be read out by the host device 703.

In addition, the client device 701 includes a non-volatile memory unit 102 and a process unit 103 as the configuration for storing and displaying the display data and the like. The non-volatile memory unit 102 may include document data 105, process state data 106, and a reaction map 111, in addition to the display data 104. The display data 104 is data to be displayed as a result of processing the document data 105 by using the host device 703. The display data 104 is received from the host device 703 and is displayed in the memory-type display body 101. The process state data 106 is data in which the processing of the document data 105, performed by the host device 703, at that time is recorded. The process state data 106 includes process context information to be referred to during the process and the like. In addition, the reaction map 111 is a map that represents commands associated with the operation buttons 109a, 109b, and 109c, and document elements and interactive elements (character lines, images, link information, and an execution instruction) that are displayed at the coordinates on the memory-type display body 101. The reaction map 111 is configured such that the client device 701 can extract the reaction to be performed in association with the operation and instruct the host device 703 to perform the reaction without reproducing the process state of the host device 703. In addition, the reaction map 111 includes two types including a reaction map relating to predetermined instructions assigned to the operation buttons 109a to 109c and a reaction map relating to extraction of the document elements. The reaction map relating to the predetermined instructions instructs the performance of predetermined operations, and the reaction map relating to the extraction of the document elements is used for extracting the document elements and the interactive elements (character lines, images, link information, and an execution instruction) that are assigned to the coordinate positions on the memory-type display body 101.

The process unit 103 of the client device 701 includes a display performing section 108 and a reaction extracting section 112. The display performing section 108 directly controls the memory-type display body 101 so as to display the updated display data 104 in the memory-type display body 101, in response to the updating of the display data 104 that is stored in the non-volatile memory unit 102. In particular, the display performing section 108 displays a raster image in the memory-type display body 101 by driving the X driver and the Y driver of the memory-type display body 101 by referring to the display data 104.

In addition, in this embodiment, the TFT (Thin Film Transistor) type may be employed.

The reaction extraction section 112 extracts data of a command or a document element, or an interactive element that is displayed in the memory-type display body 101 by using any one of the operation buttons 109a, 109b, and 109c that is operated or the coordinates (positional information) of a point touched by the pen 702 with reference to the reaction map 111. Then, the reaction extraction section 112 outputs the extracted result to the document processing unit 160 of the host device 703 through the pen 702 and the operation buttons 109a and 109c.

Furthermore, the client device 701 according to this embodiment includes a display control unit 140. The display control unit 140 includes a trajectory processing section 142 that draws an image based on the positional information detected by the transparent touch panel 180 and a composition and division section 141 that displays an image drawn by the trajectory processing section 142 and an image on the basis of the display data 104, which is the image data transmitted through the communication interface that is formed by the pen 702 and the operation buttons 109a to 109c, on the display in an overlapping manner.

In the above-described configuration, the trajectory processing section 142 serves as an image drawing unit of the client side, and the composition and division section 141 serves as an image composing unit of the client side.

The trajectory processing section 142 draws a line and the like by changing the colors of the pixels of the memory-type display body that correspond to the touch points detected by the transparent touch panel 180 to the drawing colors. In other words, the trajectory processing section 142 performs drawing by changing the colors of the pixels corresponding to the trajectory of the positional information of the touch points to the drawing colors. The drawn image (line drawing) such as a line is managed as an image (layer image) of a layer different from that of the display data 104 of the non-volatile memory unit 102 by the display control unit 140. The composition and dividing section 141 composes the layer image of the line drawing and the layer image of the display data 104 by displaying the layer image of the line drawing formed by the client device 701 and the layer image of the display data 104 formed by the host device 703 in the memory-type display body 101 in an overlapping manner.

In addition, by not displaying any one of the layer image of the line drawing formed by the client device 701 and the layer image of the display data 104 formed by the host device 703, which are displayed in an overlapping manner, the layer image of the line drawing and the layer image of the display data can be separated from each other.

By displaying the layer image of the line drawing and the layer image of the display data 104 in an overlapping manner, it is possible to provide the operator with the operation feeling such as additionally writing a marker, a commentary, or the like on the display data 104 that is formed by the host device 703 in this embodiment.

In addition, the trajectory processing section 142 may be configured to have correction information that is used for positional matching between the transparent touch panel 180 and the memory-type display body 101. It is preferable that the composition and division section 141 is configured to clear the line drawing drawn by the trajectory processing section 142 when the composed image is determined by the host device 703 to be described later, for example, after determination on the completion of input of a continuous trajectory. However, such a function is not essential, and the line drawing may be configured to remain until the composed image is updated by the host device 703.

In addition, the trajectory processing section 142 is not limited to the configuration in which the line drawing is drawn based on the positions detected by the transparent touch panel 180 and may be configured to draw an image of a pointer and the like. In such a configuration, the operability of the information processing system can be improved also for an electronic paper sheet by indicating the position viewed by the operator or the execution range of the command in a speedy manner.

In addition, the client device 701 includes a secondary cell 131 and an operation unit 132. The secondary cell 131 is a cell that is used for supplying power to the above-described configurations. The operation unit 132 has a configuration for inputting an instruction that is directly input to the client device 701 and not through the host device 703.

Host Device

The host device 703 includes a power source 190, a document processing unit 160, and an information service unit 170. The host device 703 has a configuration in which the display data 104 is generated by the document processing unit 160, and the generated display data 104 is transmitted to the client device 701 through the pen 702 and the operation buttons 109a to 109c.

The document processing unit 160 has a configuration for controlling the overall information processing system. Accordingly, the document processing unit 160 includes a document application program 161 and reads out and performs a processing routine corresponding to an instruction stored in advance in accordance the instruction for various processes that is acquired through the pen 702 and the operation buttons 109a to 109c. The document application program 161 is a program used for determining the contents of an instruction and reading out and performing a process routine corresponding to the contents.

In particular, for example, when an instruction (page skipping) for displaying the next page of an image displayed in the memory-type display body 101 is generated, the document application program 161 acquires the process state data 106 that is information on the page currently displayed in the memory-type display body 101 and the document data 105 from the non-volatile memory unit 102 through the pen 702 and the operation buttons 109a to 109c. Then, the document application program 161 generates the display data 104 of the next page and the reaction map 111 by performing a layout process for the next page based on the process state data 106 and the document data 105. In addition, the document application program 161 performs a series of process routines for storing the generated display data 104 and the reaction map 111 in the non-volatile memory unit 102 through the pen 702 and the operation buttons 109a to 109c.

The information service unit 170 has a configuration for using document data that can be transmitted to the client device 701 and other network resources. In addition, the host device 703 includes a position detecting unit 150. The position detecting unit 150 includes an observation section 151 and an operation section 152. The observation section 151 detects the coordinate pattern of a point touched by the pen 702 based on the result of light reception of the infrared ray receiving portion that is transmitted from the pen 702. The detected coordinate pattern is output to the operation section 152. The operation section 152 determines the coordinates of the touch point by performing an operation such as decoding of an information diagram for the coordinate pattern and transmits the determined coordinates to the document processing unit 160.

The document processing unit 160 processes the coordinates of the touch point that are acquired from the position detecting unit 150 in accordance with the process instruction of the document application program 161. This process may vary based on the operating document application program. For example, as the process, a process may be performed for additionally writing the trajectory corresponding to the touch point to the document data 105. In such a case, the document processing unit 160, first, stores the coordinates of the touch points, which are sequentially acquired, in a temporary memory so as to get prepared for the instruction operation performed by the operator. When the operator touches an operation button 109 corresponding to the determined operation for reflecting the trajectory after drawing a series of the trajectory while seeing the composed image displayed in the client device 701, the host device 703 determines that the corresponding operation has been performed and calls a corresponding document application program 161. Accordingly, the document processing unit 160 processes the coordinate data row that is stored. At this moment, the document processing unit 160 generates the display data, for example, as the result of additionally writing the trajectory corresponding to the touch points based on the instruction from the document application program 161 and transmits the display data to the client device 701 together with the instruction to display the display data instead of the layer image generated by the client device 701 side.

Generally, the composed image that is generated by the host device 703 side has image quality that is higher than the composed image generated by displaying the layer images in an overlapping manner. For this reason, according to this embodiment, a line drawing or the like can be displayed in the memory-type display body 101 in a speedy manner based on the touch of the pen 702 from the viewpoint of the operator's operability, and the displayed image can be replaced later by the composed image with higher image quality.

Here, the reason that the image quality of the composed image generated by the host device 703 can be higher than that of the composed image generated by the client device 701 side is that the request for decreasing the size and weight of the configuration for the position detection and image processing to the host device 703 side is less than that to the client device 701.

In the above-described configuration, the document processing unit 160 serves as an image drawing unit of the host side, the host-side image composing unit that generates a composed image acquired by composing the drawn image and an image on the basis of the image data transmitted by the communication unit, and a display control unit that displays the composed image in the memory-type display body 101 instead of the layer image after the layer image is displayed on the client device 701 side.

Driving Method

Next, the operation of the information processing system 1000 according to this embodiment and the driving of the memory-type display body 101 will now described. The driving of the memory-type display body 101 will be described with reference to FIG. 17.

When the pen 702 is brought into contact with the touch panel 180, both the host device 703 and the client device 701 are activated so as to be in a communicatable state. At this moment, the client device 701 electrically connects the wirings of the pixels 20 of the memory-type display body 101 to the driving circuit (Step S11). As represented in Step S11 shown in FIG. 17, the low level (0 V) is input to the scanning line 4, the high level (4 V) is supplied to the high electric-potential power source line 13, and the low level (0 V) is supplied to the low electric-potential power source line 14. Accordingly, the latch circuit 25 is in the power-on state so as to be in a state in which the image data input from the data line 5 can be stored (Step S11).

Figure 17:
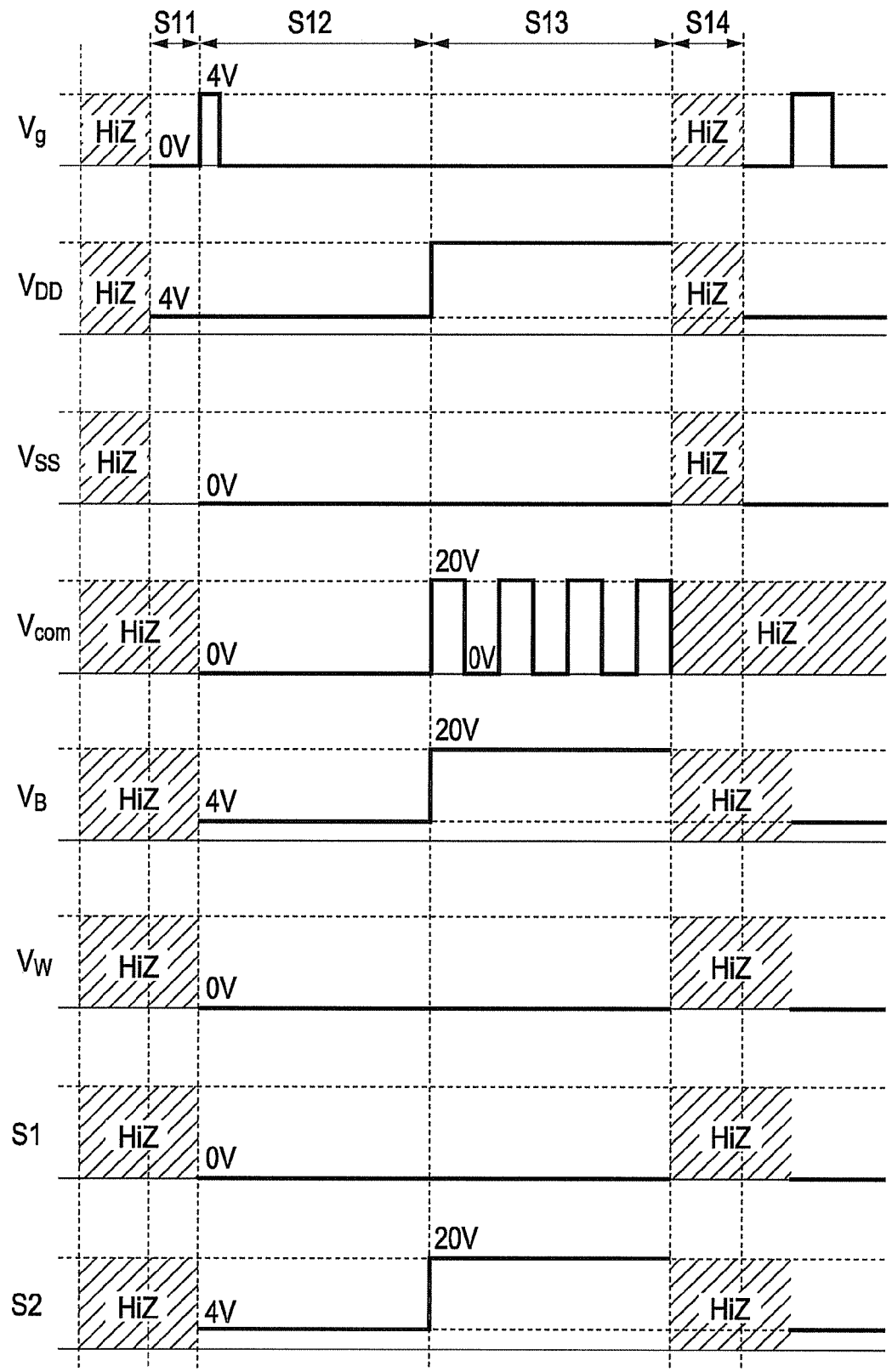
FIG. 17 is a timing chart representing the driving of a memory-type display body according to another embodiment of the invention.

Thereafter, the client device 701 supplies the low level (0 V) to the common electrode 22 (Step S12). By supplying the low level (0 V) to the common electrode 22, the input of the pen 702 or the like performed thereafter becomes effective. As shown in FIG. 17, in this embodiment, it is preferable that the period of Step S12, during which writing by using the pen 702 is effective, is set to a period in which, for example, about 20 to 30 frames are continuously repeated.

The host device 703 detects contact of the pen 702 with the touch panel 180 and generates coordinate data (positional information) that represents the coordinates of the contact position based on the result of detection. The host device 703 transmits the coordinate data to the client device 701 as new display data 104. In the image signal on the basis of this display data 104, a touch panel signal is included. This display data 104 becomes data that allows the high-level (4 V) electric potential to be input to the pixel electrode 21 corresponding to the coordinates of the contact position and the low-level (0 V) electric potential to be input to the other pixel electrodes 21.

In addition, when the contact position of the pen 702 is moved, the host device 703 detects the moving direction (the direction of the trajectory of the positional information) of the contact position on the touch panel 180 based on the coordinates detected by the operation section 152. At this moment, as the moving direction, one out of two arrangement directions (the vertical direction in this embodiment) of the scanning line 4 is detected. After detecting the moving direction, the host device 703 transmits data relating to the corresponding moving direction to the client device 701.

The client device 701 inputs the transmitted display data 104 to the memory-type display body 101. As a result, a high-level signal is input to the data line 5 that is connected to the memory circuit 25 corresponding to the coordinates of the contact position, and a low-level signal is input to the other data lines 5. When a scanning signal is input in such a state, the second control line 12 is connected to the pixel electrode 21 corresponding to the coordinates of the contact position, and the high level is input to the pixel electrode 21. On the other hand, the first control line 11 is connected to the other pixel electrodes 21, and the low level is input to the other pixel electrodes 21.

At this moment, the client device 701 sequentially supplies the scanning signals to the plurality of scanning lines 4 in the direction that is the same as the moving direction (either the upward direction or the downward direction) of the contact position (contact area) with respect to the arrangement direction of the scanning lines 4 used as a reference.

Figure 18:
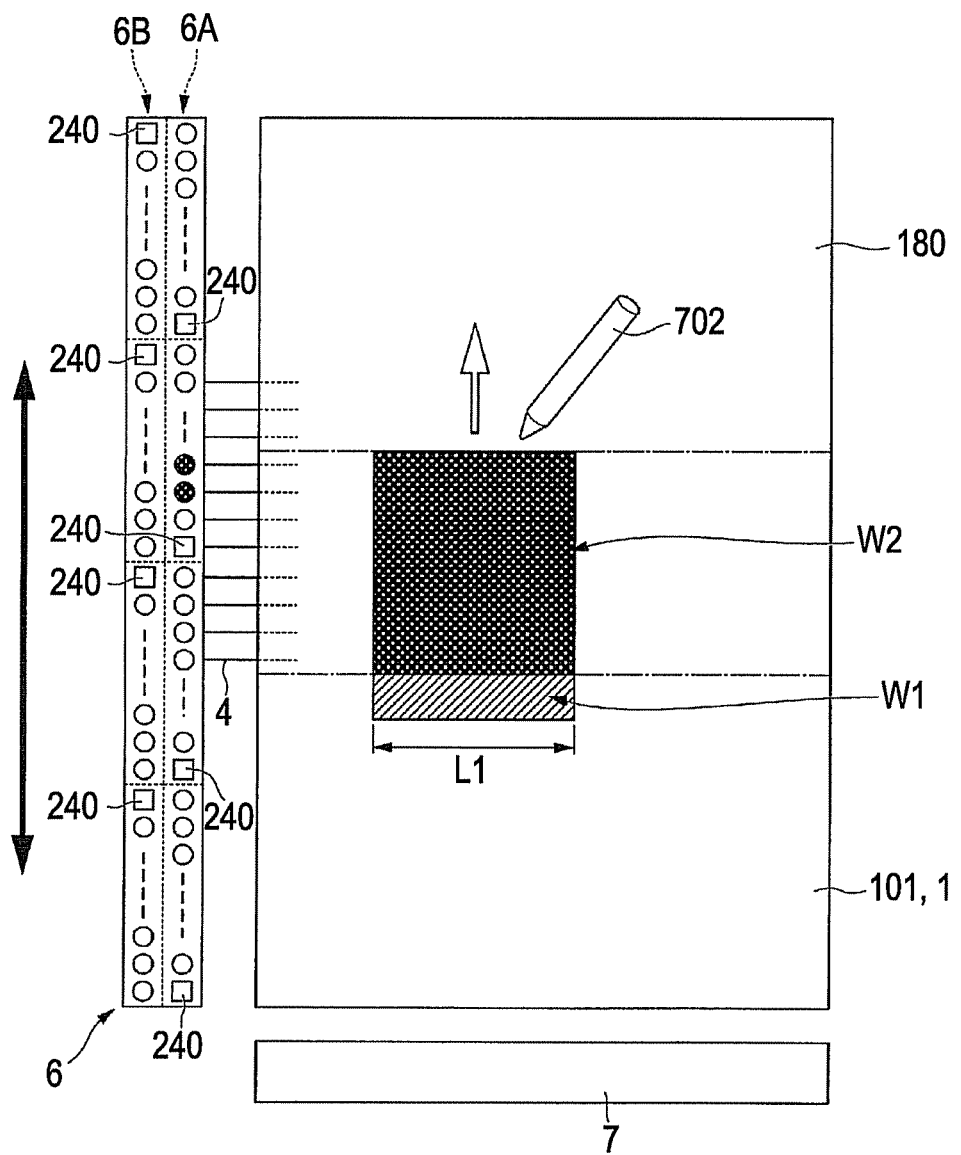
FIG. 18 is a diagram showing the appearance of the driving of a memory-type display body according to an embodiment of the invention.

For example, as shown in FIG. 18, when the pen 702 is moved on the touch panel 180 upward in the figure, the scanning signal is sequentially supplied in the forward direction from the lower side to the upper side in the figure. By performing this operation, detection and display of the contact area W2 are performed in accordance with the movement of the corresponding contact area W2 of the pen 702.

In particular, the client device 701 inputs a start pulse to four start pulse inputting terminals 240, located on the right-side area 6A in the figure, of the scanning line driving circuit 6. The client device 701 inputs a start pulse to the start pulse inputting terminal 240, which is located closest to the scanning line 4 corresponding to the contact area W2 that is contacted first on the touch panel 180 and is disposed on the upstream side in the moving direction relative to the contact area W2, out of the plurality of start pulse inputting terminals 240 of the scanning line driving circuit 6. In FIG. 18, for example, the start pulse is input to the start pulse inputting terminal 240 that is located second from the lower side.

In addition, as shown in FIG. 18, it is preferable that the scanning signal is simultaneously input to a plurality of the scanning lines 4 (eight scanning lines in FIG. 18) when the scanning signal is input. According to this embodiment, in the scanning line driving circuit 6, the input period for a start pulse that is used for starting the sequential selection operation extends over a plurality of the periods. Accordingly, a plurality of scanning lines 4 is selected during the input period for the start pulse, and the scanning signal is simultaneously input to the plurality of the scanning lines 4.

In this embodiment, since the electric potential Vcom of the common electrode 22 is in the low level, the electrophoretic particles 42 and 43 do not move for the pixel electrode 21 to which the low level is input. On the other hand, for the pixel electrode 21 to which the high level is input, the black particles 43 move to the common electrode 22 side, and the white particles 42 move to the pixel electrode 21 side. Accordingly, an image W1 is displayed in which black display is newly written additionally in the pixels 20 corresponding to the trajectory of the contact area W2 for the image that has been displayed. Therefore, the follow-up for the movement of the contact area W2 of the pen 702 is improved, and accordingly, display switching in the memory-type display body 101 can be performed more smoothly. Thereafter, in Step S13 shown in FIG. 17, the electric potential of the high electric-potential power source line 13 is raised from 4 V to 20 V, and the contrast of the image W1 is increased.

Figure 19:
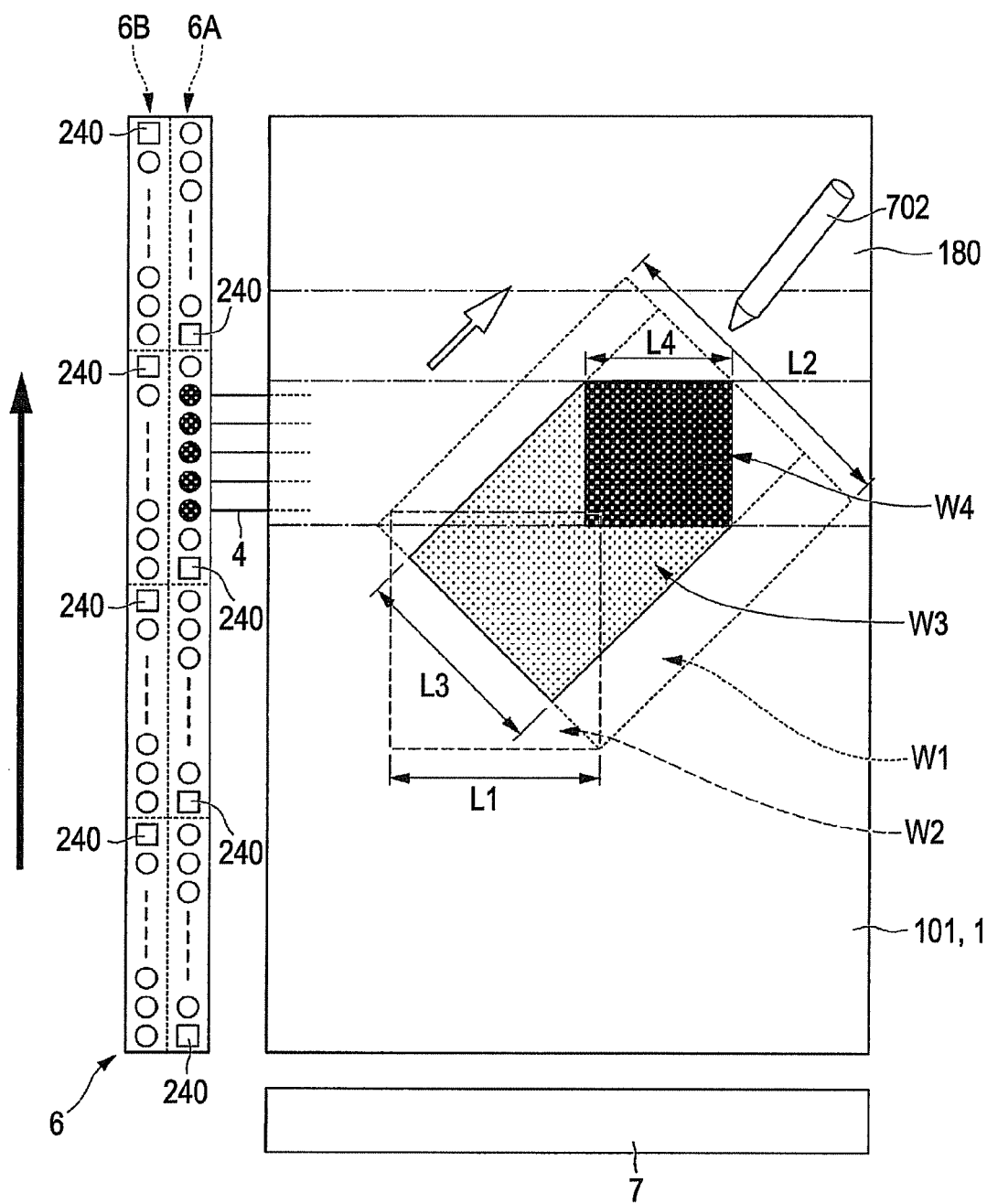
FIG. 19 is a diagram showing the appearance of the driving of a memory-type display body according to an embodiment of the invention.

On the other hand, for example, as shown in FIG. 19, also for the case where the pen 702 is moved on the touch panel 180 to the upper right side in the figure, the scanning signal is supplied in the forward direction from the lower side to the upper side in the figure. However, in such a case, as shown in FIG. 19, when the control operation that is the same as that performed for the case where the contact area W2 is moved in the arrangement direction of the corresponding scanning lines 4 is performed, the width (the size in the direction perpendicular to the moving direction) of the area input as the image W1 is increased. In other words, the width L2 for the case where the contact area W2 is moved in the upper right side in the figure becomes larger than the width L1 for the case where the contact area W2 is moved to the upper side in the figure.

In the case where the contact area W2 is moved in a tilted direction with respect to the arrangement direction of the scanning lines 4 as described above, the number of the scanning lines 4 that are simultaneously selected is adjusted based on the size of the reduced area W4 reduced from the actual contact area W2. In such a case, the size of the area W4 is reduced such that the width L2 of the area input as the image is the same as the width L1, that is, for example, such that the relationship of L1:L2=L4:L3 is satisfied. When the number of the scanning lines 4 is adjusted based on the size of the reduced area W4 in the vertical direction in the figure, in FIG. 19, for example, five scanning lines 4 are simultaneously selected. As described above, by adjusting the number of the scanning lines 4 that are simultaneously selected, an image W3 having the same width as that of the image W1 is displayed.

In addition, for example, in the case where the contact area W2 has a rectangular shape, when the moving direction of the contact area W2 is the direction of the normal line of the diagonal line of the contact area W2, the size of the image W1 becomes the largest. In such a case, the size of the reduced area W4 becomes the smallest.

Figure 20:
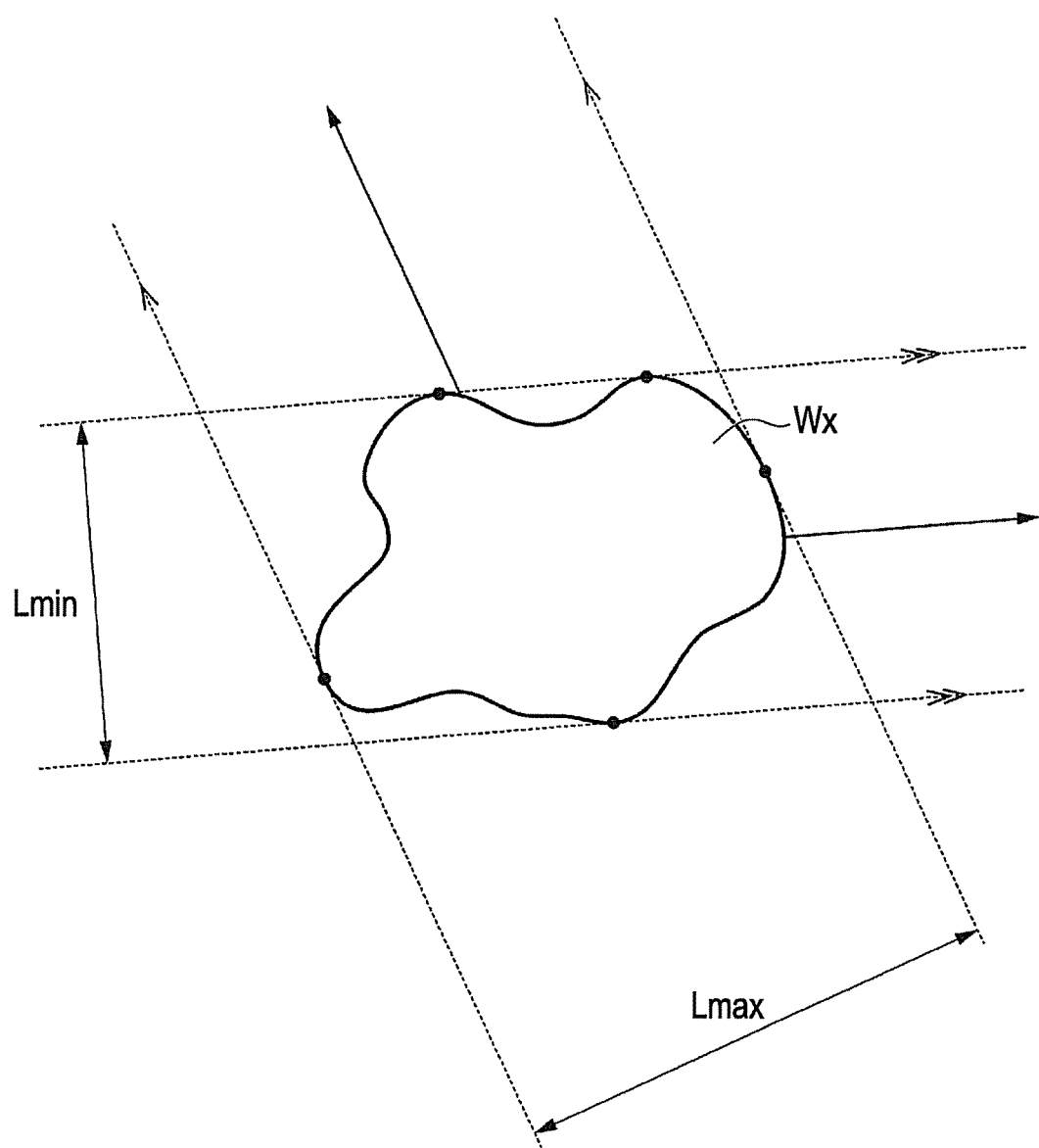
FIG. 20 is a diagram showing the appearance of the driving of a memory-type display body according to an embodiment of the invention.

In addition, as shown in FIG. 20, for a contact area Wx having an arbitrary shape, in the case where the contact area Wx is interposed between two parallel straight lines such that at least one point of each of the two parallel straight lines is brought into contact with the contact area Wx, when the contact area Wx is moved in the extending direction of the two straight lines that sets a distance between the two parallel straight lines to be the longest, the width of the trajectory displayed as an image becomes the largest (Lmax). On the contrary, when the contact area Wx is moved in the extending direction of the two straight lines that sets a distance between the two parallel straight lines to be the shortest, the width of the trajectory displayed as an image becomes the smallest (Lmin). Accordingly, in the case where the shape of the contact area Wx is determined in advance based on the image data or the like, it may be configured that the contact area Wx is transformed (reduced or enlarged) such that the width of the trajectory displayed as an image, for example, is an approximate median of the maximum value Lmax and the minimum value Lmin, and the number of the scanning lines 4 that are simultaneously selected is set in advance based on the transformed area.

In addition, the contact area W2 may not be reduced or enlarged when changing the width of the trajectory displayed as an image. Furthermore, a mode for enlarging or reducing the contact area W2 and a mode for not enlarging or reducing the contact area W2 may be switched between each other.

In addition, it may be configured that data for a plurality of coordinates of the contact positions is stored in a buffer not shown in the figure and one display data 104 is generated based on the data for the plurality of coordinates, in the case where the contact position (contact area) on the touch panel 180 is moved. In such a case, the high level is supplied to the plurality of data lines 5 as a whole. By combining such a configuration with the above-described example in which the scanning signal is simultaneously supplied to the plurality of scanning lines 4, the range for a plurality of lines disposed in the vertical and horizontal directions can be rewritten at once by performing one scanning operation. Accordingly, the time required for rewriting can be shortened markedly, and thereby display can be rewritten in real time. In such a case, the number of the data lines 5 to which the high level is simultaneously supplied may be the same as or different from the number of the scanning lines 4 to which the scanning signal is simultaneously supplied.

As described above, according to this embodiment, during the operation inputting period in which the operation for the touch panel 180 is performed (in other words, the positional information is input to the touch panel 180), the touch panel signal is supplied to the memory circuit 25 by simultaneously supplying the scanning signal to the plurality of scanning lines 4. Accordingly, the response of writing the display based on the touch panel signal can be improved. In addition, since the scanning signal is supplied from the scanning line 4 out of the plurality of scanning lines 4 corresponding to the contact position on the touch panel 180 or a position located adjacent thereto, the response of writing the display can be improved further.

In addition, according to this embodiment, the number of scanning lines to which the scanning signal is simultaneously supplied is adjusted in accordance with the arrangement direction of the scanning lines 4 and the direction of the operation trajectory in the case where the operation trajectory is tilted with respect to the arrangement direction of the scanning lines 4. Accordingly, the display state can be maintained to be constant without depending on the tilt of the operation trajectory.

In addition, according to this embodiment, the electric potential Vcom of the common electrode 22 is set to the low level (0 V) when input is performed by using the pen 702. Thus, by inputting the high level to the pixel electrode 21 corresponding to the contact position on the touch panel 180 and inputting the low level to the other pixel electrodes 21, data writing can be performed selectively for a portion for which writing is newly performed. As a result, the power consumption can be reduced, and the writing can be performed at a high speed.

In addition, according to this embodiment, in the case where the pen 702 is moved on the touch panel 180, the scanning signals are sequentially supplied in the direction following the moving direction of the pen 702. Therefore, the scanning response can be improved further, and an image can be updated in real time.

In addition, in the case where the electrophoretic display device 1 is mounted on the information processing system 1000, an operation for inputting a reference pulse having a rectangular shape in which the low-level (0 V) period and the high-level (4 V) period are repeated for a plurality of the periods as the electric potential Vcom of the common electrode 22 may be performed when input is performed by using the pen 702.

The entire disclosure of Japanese Patent Application No. 2008-323616, filed Dec. 19, 2008 is expressly incorporated by reference herein.

What is claimed is:

1. A method of driving a touch panel-mounted electrophoretic display device, the touch panel-mounted electrophoretic display device including:
   an electrophoretic element including electrophoretic elements, the electrophoretic element being disposed between one pair of substrates;
   a plurality of scanning lines and a plurality of data lines;
   a plurality of pixels arranged at positions corresponding to intersections of the plurality of scanning lines and the plurality of data lines,
   wherein a first electrode is formed for each of the pixels on one of the substrates, and a second electrode facing the pixel electrodes is formed on the other of the substrates,
   wherein each of the pixels includes:
   a pixel switching element that is connected to the scanning line aligned in a first direction and the data line disposed in a second direction;
   a memory circuit that is connected to the pixel switching element; and
   a switching circuit that is disposed between the memory circuit and the first electrode, and
   wherein a first control line and a second control line are connected to the switching circuit,
   the method comprising:
   connecting the first control line or the second control line and the first electrode by operating the switching circuit based on the output of the memory circuit, and setting the electric potential of the first control line and the electric potential of the second control line to a first electric potential and a second electric potential, during an operation inputting period in which positional information is input to the touch panel; and
   inputting an image signal that includes a touch panel signal used for displaying the trajectory of the positional information input to the touch panel in the electrophoretic element to the memory circuit of the selected pixel through the data lines and the pixel switching element by selecting the pixel that is connected to the corresponding scanning line by simultaneously supplying a scanning signal to the plurality of scanning lines in a state in which the electric potential of the second electrode is set to the first electric potential.

2. The method according to claim 1, wherein, in the inputting of an image signal, the scanning signal is supplied from the scanning line, which is connected to the pixel corresponding to the positional information input to the touch panel or a position near the positional information, out of the plurality of scanning lines.

3. The method according to claim 1, wherein a contrast raising period, when the electric potential of the first control line is set to a third electric potential that is higher than the first electric potential, is included after the operation inputting period.

4. The method according to claim 1, wherein, in the inputting of an image signal, the number of the scanning lines to which the scanning signal is simultaneously supplied is adjusted in accordance with the arrangement direction of the scanning lines and the direction of the trajectory of the positional information in the case where the trajectory of the positional information is tilted with respect to the arrangement direction of the scanning lines.

5. The method according to claim 1, wherein the inputting of an image signal is continuously performed several times during the operation inputting period.

6. A touch panel-mounted electrophoretic display device comprising:
an electrophoretic element including electrophoretic elements, the electrophoretic element being disposed between one pair of substrates;
a plurality of scanning lines and a plurality of data lines;
a plurality of pixels arranged at positions corresponding to intersections of the plurality of scanning lines and the plurality of data lines,
wherein a first electrode is formed for each of the pixels on one of the substrates, and a second electrode facing the pixel electrodes is formed on the other of the substrates,
wherein each of the pixels includes:
a pixel switching element that is connected to the scanning line aligned in a first direction and the data line disposed in a second direction;
a memory circuit that is connected to the pixel switching element; and
a switching circuit that is disposed between the memory circuit and the first electrode, and
wherein a first control line and a second control line are connected to the switching circuit,
the electrophoretic display device comprising: a control device that performs:
connecting the first control line or the second control line and the first electrode by operating the switching circuit based on the output of the memory circuit, and setting the electric potential of the first control line and the electric potential of the second control line to a first electric potential and a second electric potential, during an operation inputting period in which positional information is input to the touch panel; and
inputting an image signal that includes a touch panel signal used for displaying the trajectory of the positional information input to the touch panel in the electrophoretic element to the memory circuit of the selected pixel through the data lines and the pixel switching element by selecting the pixel that is connected to the corresponding scanning line by simultaneously supplying a scanning signal to the plurality of scanning lines in a state in which the electric potential of the second electrode is set to the first electric potential.

7. The electrophoretic display device according to claim 6, wherein the control device includes a scanning line driving circuit that can simultaneously select a plurality of the scanning lines.

8. The electrophoretic display device according to claim 7, wherein the scanning line driving circuit has a plurality of start pulse inputting terminals to which a start pulse is input which is used for starting a sequential selection operation for the plurality of scanning lines.

9. The electrophoretic display device according to claim 7, wherein the scanning line driving circuit is disposed so as to be able to sequentially select the scanning lines in two arrangement directions of the plurality of the scanning lines.

10. An electronic apparatus comprising: the electrophoretic display device according to claim 7.

* * * * *